United States Patent
Morifuji et al.

(10) Patent No.: US 10,297,055 B2
(45) Date of Patent: May 21, 2019

(54) IMAGE PROCESSING APPARATUS AND METHOD FOR MODIFYING A DISPLAY TEXTURE OF AN IMAGE

(71) Applicant: SONY CORPORATION, Tokyo (JP)

(72) Inventors: Takafumi Morifuji, Tokyo (JP); Masato Akao, Kanagawa (JP); Masami Ogata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 391 days.

(21) Appl. No.: 14/257,129

(22) Filed: Apr. 21, 2014

(65) Prior Publication Data
US 2014/0340415 A1  Nov. 20, 2014

(30) Foreign Application Priority Data

May 14, 2013 (JP) .................................. 2013-102106

(51) Int. Cl.
| | |
|---|---|
| *G06T 11/60* | (2006.01) |
| *G06T 11/00* | (2006.01) |
| *G06T 15/50* | (2011.01) |
| *G06T 15/60* | (2006.01) |

(52) U.S. Cl.
CPC ............ *G06T 11/60* (2013.01); *G06T 11/001* (2013.01); *G06T 15/50* (2013.01); *G06T 15/60* (2013.01)

(58) Field of Classification Search
None
See application file for complete search history.

(56) References Cited

U.S. PATENT DOCUMENTS

| | | | | |
|---|---|---|---|---|
| 2007/0160307 A1* | 7/2007 | Steinberg | ............. | G06T 7/0042 382/254 |
| 2009/0141027 A1* | 6/2009 | Sato | ..................... | G01B 11/002 345/426 |
| 2011/0032389 A1* | 2/2011 | Miyawaki | ............. | G06T 7/0002 348/234 |
| 2011/0274351 A1* | 11/2011 | Tsukada | ................. | H04N 1/628 382/167 |
| 2012/0177426 A1* | 7/2012 | Fujita | ................. | G03G 15/6585 399/341 |

FOREIGN PATENT DOCUMENTS

WO    WO2010/087162 A1    8/2010

OTHER PUBLICATIONS

Khan, Erum Arif, et al. "Image-based material editing." ACM Transactions on Graphics (TOG) 25.3 (2006): 654-663.*
The physics classroom, "Specular vs. Diffuse Reflection" posted 2001, http://www.physicsclassroom.com/class/refln/Lesson-1/Specular-vs-Diffuse-Reflection.*
Feb. 14, 2018, Chinese Office Action issued for related CN Application No. 201410190498.2.

* cited by examiner

*Primary Examiner* — Sarah Le
(74) *Attorney, Agent, or Firm* — Paratus Law Group, PLLC

(57) ABSTRACT

An image processing apparatus includes a physical property parameter acquisition unit and a texture control unit. The physical property parameter acquisition unit is configured to acquire a physical property parameter on a subject in an image. The texture control unit is configured to control a texture of the subject in the image by using the physical property parameter acquired by the physical property parameter acquisition unit.

20 Claims, 33 Drawing Sheets

FIG. 4

| Control parameter | | | | Visual environment parameter | | | Processing details |
|---|---|---|---|---|---|---|---|
| Physical property parameter of subject | | | | Visual environment light | Viewing time | Subject of interest (line of sight) | |
| Depth and form information | Lighting information | Material information | Reflection property information | | | | |
| Dense form (uneven) | | | | | | | Shading (self shadow) emphasis |
| | Lighting color | | | | | | White balance adjustment |
| | | | | Bright | | | Contrast adjustment based on lightness function |
| | | | | Bright | | | Increase contrast based on lightness function |
| | | | | Dark | | | Reduce contrast based on lightness function |
| | | | | Dark | | | Contrast adjustment based on lightness function |
| Sparse form | | | | | | | Shading (cast shadow) emphasis |
| | | | Specular reflection component is strong | | | | Synthesize specular reflection component with emphasis |
| | | | Diffuse reflection component is strong | | | | Weaken diffuse reflection component and emphasize specular reflection component |
| | | Type of material | | | | | Adjust reflection property in accordance with type |
| | | Type of material | | | | | Restore texture in accordance with type |
| | | Metal | | | | | Emphasize specular reflection component |
| | | Wood | | | | | Reduce specular reflection component |
| | | | | Bright | | | Display to be bright based on lightness function |
| | | | | Dark | | | Display to be dark based on lightness function |
| | | | | | | Target area | Apply above-mentioned control |
| | | | | | | Non-target area | Not apply above-mentioned control |
| | | | | | | Non-target area | Defocus |
| | | | | | Short | | Normal processing |
| | | | | | Long | | Gradually reduce brightness and weaken such processing |

IMAGE PROCESSING APPARATUS AND METHOD FOR MODIFYING A DISPLAY TEXTURE OF AN IMAGE

CROSS REFERENCE TO RELATED APPLICATIONS

This application claims the benefit of Japanese Priority Patent Application JP 2013-102106 filed May 14, 2013, the entire contents of which are incorporated herein by reference.

BACKGROUND

The present disclosure relates to an image processing apparatus and an image processing method, and more particularly to, an image processing apparatus and an image processing method that are capable of reproducing a texture of an object with reality.

In order to enhance the reality of a video, a technique of adjusting a contrast, fineness, and the like has been developed.

International Publication No WO2010/087162 proposes a technique of implementing a color correction and a desired color reproduction of an object in an image, to achieve a high image quality.

SUMMARY

However, the limitations on performance are not eliminated only by the enhancement of the basic image quality including a contrast and fineness. In this regard, for example, there is a demand for reproducing a texture of an object with reality, such as a demand for reproducing, with a video, a situation as if a person actually looked at the subject.

The present disclosure has been made in view of such circumstances and it is desirable to reproduce a texture of an object with reality.

According to an embodiment of the present disclosure, there is provided an image processing apparatus including: a physical property parameter acquisition unit configured to acquire a physical property parameter on a subject in an image; and a texture control unit configured to control a texture of the subject in the image by using the physical property parameter acquired by the physical property parameter acquisition unit.

The physical property parameter may include reflection property information that indicates reflection property of the subject, and the texture control unit may be configured to adjust a level of the reflection property of the subject in the image by using the reflection property information.

The reflection property information may include information indicating that the reflection property of the subject includes a strong specular reflection component, and the texture control unit may be configured to emphasize the specular reflection component of the subject in the image by using the reflection property information.

The physical property parameter may include information that indicates a material of the subject, and the texture control unit may be configured to adjust reflection property of the subject in the image in accordance with a type of the material of the subject.

The physical property parameter may include information that indicates a form of the subject, and the texture control unit may be configured to emphasize a shading of the subject in the image in accordance with the form of the subject.

The physical property parameter may include information on lighting of the subject, and the texture control unit may be configured to adjust a contrast of the subject in the image in accordance with the lighting.

The physical property parameter may include measured property information and estimated property information, the measured, property information being property information that is measured when the image of the subject is captured, the estimated property information being property information that is estimated based on the image, the image processing apparatus may further include an information integration unit configured to integrate the measured property information and the estimated property information and generate an integrated physical property parameter, and the texture control unit may be configured to control the texture of the subject in the image by using the physical property parameter integrated by the information integration unit.

The image processing apparatus may further include a visual environment information acquisition unit configured to acquire visual environment information that is information on an environment in which the image is viewed, and the texture control unit may be configured to control the texture of the subject in the image by using the visual environment information acquired by the visual environment information acquisition unit.

The physical property parameter acquisition unit may be configured to acquire the physical property parameter that is measured when the image of the subject is captured.

The physical property parameter acquisition unit may be configured to acquire the physical property parameter by an estimation based on the image.

According to another embodiment of the present disclosure, there is provided an image processing method including: by an image processing apparatus, acquiring a physical property parameter on a subject in an image; and controlling a texture of the subject in the image by using the acquired physical property parameter.

In an embodiment of the present disclosure, the physical property parameter on the subject in the image is acquired, and the texture of the subject in the image is controlled by using the acquired physical property parameter.

According to an embodiment of the present disclosure, an image can be processed. In particular, a texture of an object with reality can be reproduced.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 4 is a diagram showing a control parameter and processing details for texture control determined by the control parameter;

DETAILED DESCRIPTION OF EMBODIMENTS

Hereinafter, modes for carrying out the present disclosure (hereinafter, referred to as embodiments) will be described. It should be noted that the description will be given in the following order.

1. Outline of Present Disclosure
2. First Embodiment
3. Second Embodiment
4. Third Embodiment
5. Fourth Embodiment
6. Fifth Embodiment
7. Sixth Embodiment
8. Seventh Embodiment
9. Eighth Embodiment
10. Ninth Embodiment 1. Outline of Present Disclosure (Concept of Present Disclosure)

Figure 1:
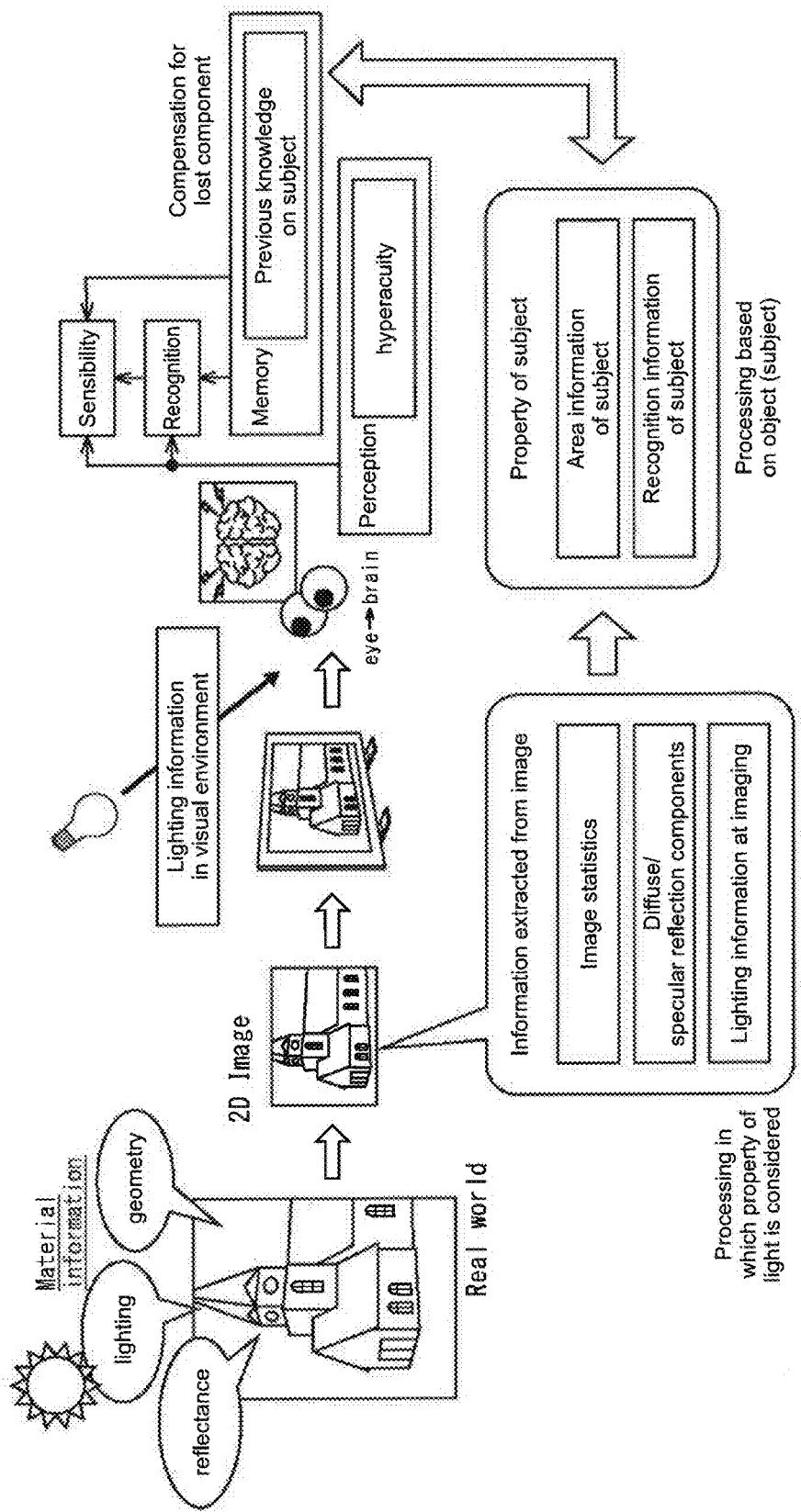
FIG. 1 is a diagram for describing the concept of the present disclosure.

The concept of the present disclosure will be described with reference to FIG. 1. The present disclosure is directed to improve a texture of an object in an image.

In the real world, what a human perceives by the eyes, that is, material information on how light comes into the eyes, is basically necessary information. The material information includes, for example, sunlight (lighting), the form (geometry) of an object, and a reflection component (reflectance) of the object. With such material information, light can be reproduced in theory.

The material information enters a sensor of a camera. Thus, the material information can be estimated and acquired as property information of a subject, such as area information or recognition information of the subject, based on information extracted from an image (2D image), such as image statistics, diffuse/specular reflection components, and lighting information at the time of imaging.

The processing of extracting the information from the image is processing in which the property of light is taken into consideration, and the processing of estimating the extracted results to be the property information of the subject is processing based on an object (subject).

Hence, in the present disclosure, the information extracted from the image is used as the property information of the subject to control the texture of (the surface of) the subject in the image. Additionally, in the control, material information measured and acquired from the real world can be used.

Further, the texture of the subject in the image is actually related to not only the material information but also information on an environment seen by a human (lighting information in visual environment) and information on what a human perceives, i.e., a perception (hyperacuity). Hence, in the present disclosure, by using not only the material information but also the information on an environment seen by a human (lighting information in visual environment) and the information on what a human perceives, the texture of the subject in the image is controlled and the image is recreated.

In such a manner, in the present disclosure, the texture of the subject in the image is controlled. In this specification, the texture refers to a psychological sensation (psychological factor) of a human, which is caused for the nature of a material (physical factor).

In other words, in this specification, the texture is defined to include a parameter that represents physical property of a subject, which is a physical factor, and a parameter that represents a cognitive sensitivity of the subject, which is a psychological factor.

Hence, the texture control in this specification means the control of the parameters of the physical and psychological factors described above. Hereinafter, such description that a physical property parameter serving as a parameter of the physical factor is controlled at the time of the texture control will be given. In actuality, however, the parameter that represents the cognitive sensitivity of the subject, which is a parameter of the psychological factor, is also controlled in the texture control.

(Texture Control Method of Present Disclosure)

Next, a texture control method of the present disclosure will be described with reference to FIG. 2.

First, an image of a subject in the real world is captured and input to a measurement/estimation block 1. In the measurement/estimation block 1, a physical property parameter that represents the physical property of the subject is measured and acquired from the real world at the time of imaging of the subject. Alternatively, in the measurement/estimation block 1, a physical property parameter that represents the physical property of the subject is estimated and acquired from the input image of the subject. For example, the lighting, structure of the subject, and reflection property described above are acquired as the physical property parameters.

The acquired physical property parameters of the subject are modeled in a real-world modeling block 2. The modeled physical property parameters of the subject are input to a texture control block 3.

In the texture control block 3, the texture of the subject in the image is controlled in accordance with the modeled physical property parameters of the subject and a feature amount (texture) acquired from the image. Examples of the texture control include changing of the physical property parameters so as to easily cause reflection. This optimizes the optical property of the subject. Further, for example, if there is a part with an insufficient texture, the part is appropriately restored. In other words, in the texture control block 3, in order to visually improve the luster or the transparency, as the texture control, those physical property parameters are changed (controlled).

In the rendering/retouching block 4, in order to restructure the image in accordance with the results of the texture control (changed parameters), the image is resynthesized (rendered) and a resultant image whose image quality is finely adjusted is output.

Through the above processing according to one embodiment of the present disclosure, for example, the optimization of the illumination light, the improvement of the luster, and the reproduction of the transparency are performed when an input image is found different from actual visual effects. In other words, the situation where the subject is actually looked at can be reproduced with a video.

(Configuration Example of Image Processing Apparatus)

Figure 3:
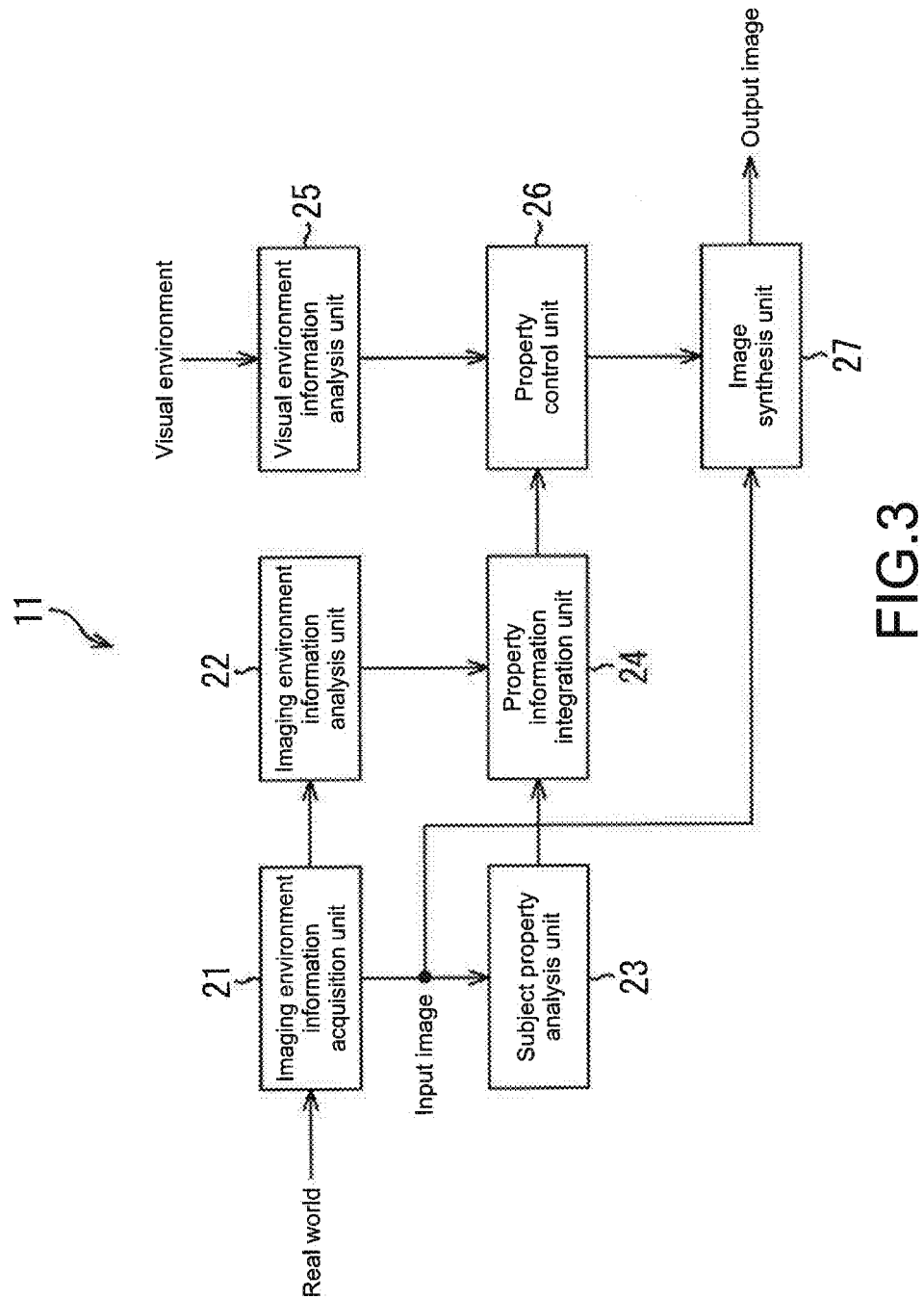
FIG. 3 is a block diagram showing a principal configuration example of an image processing apparatus.

FIG. 3 is a block diagram showing a configuration of an image processing apparatus according to one embodiment of the present disclosure.

In an image processing apparatus 11 shown in FIG. 3, as described above, an image of a subject in the real world is captured, a physical property parameter on the subject in the input image is acquired, the texture of the subject in the image is controlled, and an image in which the texture of the subject is controlled is output.

The image processing apparatus 11 includes an imaging environment information acquisition unit 21, an imaging environment information analysis unit 22, a subject property analysis unit 23, a property information integration unit 24, a visual environment information analysis unit 25, a property control unit 26, and an image synthesis unit 27.

Figure 2:
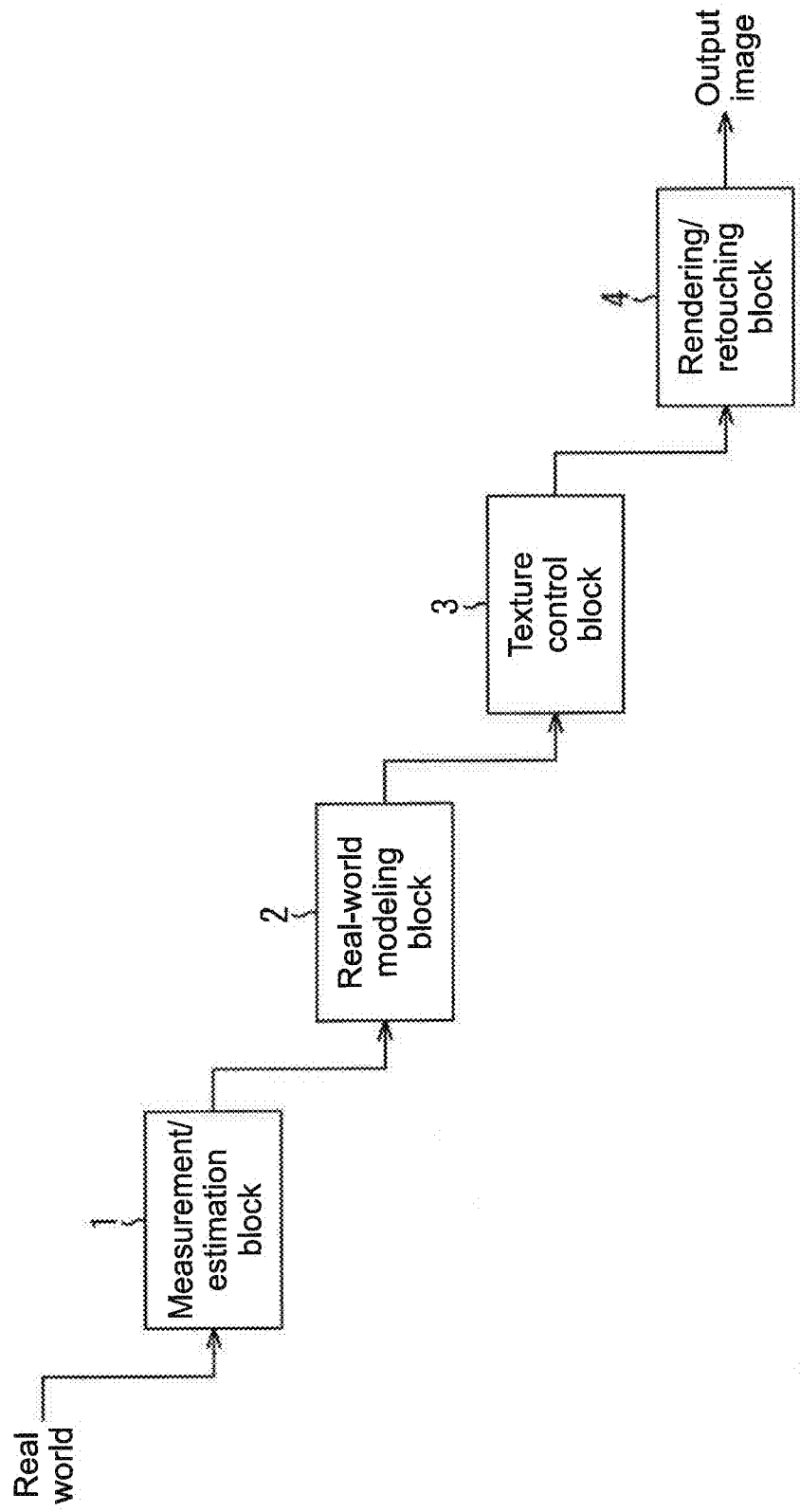
FIG. 2 is a diagram for describing a texture control method of the present disclosure.

The imaging environment information acquisition unit 21, the imaging environment information analysis unit 22, and the subject property analysis unit 23 correspond to the measurement/estimation block 1 of FIG. 2. The property information integration unit 24 corresponds to the real-world modeling block 2 of FIG. 2. The property control unit 26 corresponds to the texture control block 3 of FIG. 2. The image synthesis unit 27 corresponds to the rendering/retouching block 4 of FIG. 2.

The imaging environment information acquisition unit 21 captures an image of a subject, inputs the image of the subject, and supplies the input image to the subject property analysis unit 23 and the image synthesis unit 27. Further, the imaging environment information acquisition unit 21 acquires imaging information on an environment and the subject at the time of imaging of the subject and supplies the acquired imaging information to the imaging environment information analysis unit 22.

The imaging environment information analysis unit 22 analyzes the imaging information that has been acquired from the imaging environment information acquisition unit 21 at the time of imaging, and supplies the analyzed imaging information to the property information integration unit 24.

The subject property analysis unit 23 estimates and analyzes the property of the subject, based on the input image supplied from the imaging environment information acquisition unit 21, and supplies the analysis results serving as image estimation information to the property information integration unit 24. The subject property analysis unit 23 can acquire information of fine parts (e.g., parts with high sampling rate), which is not acquired as the imaging information at the time of imaging, by estimation based on the image.

The property information integration unit 24 integrates the imaging information supplied from the imaging environment information analysis unit 22 and the image estimation information supplied from the subject property analysis unit 23 and supplies the resultant information to the property control unit 26 as a physical property parameter on the subject.

The visual environment information analysis unit 25 acquires and analyzes information on a visual environment in which images are viewed. The visual environment information analysis unit 25 supplies the analysis results serving as visual environment information to the property control unit 26 as a visual environment parameter.

The property control unit 26 uses, as control parameters, the physical property parameter on the subject from the property information integration unit 24 and the visual environment parameter from the visual environment information analysis unit 25. Specifically, for example, the property control unit 26 determines processing details for controlling the texture, such as changing the image quality, adjusting reflection property, and changing the form, based on the physical property parameter from the property information integration unit 24. The property control unit 26 supplies the information on the determined processing details to the image synthesis unit 27 and causes the image synthesis unit 27 to perform the texture control. Additionally, the property control unit 26 causes the image synthesis unit 27 to perform the texture control in accordance with the visual environment parameter, to optimize the texture control.

Under the control of the property control unit 26, the image synthesis unit 27 resynthesizes (performs rendering on) the image input from the imaging environment information acquisition unit 21, adjusts the image, and outputs the resynthesis results as an output image.

(Control Parameter and Processing Details)

FIG. 4 is a diagram showing examples of a control parameter that is referred to in the property control unit 26 and processing details for the texture control determined by the control parameter.

The control parameter is constituted of the physical property parameter on the subject and the visual environment parameter. The physical property parameter includes the imaging information supplied from the imaging environment information analysis unit 22 and the image estimation information supplied from the property analysis unit 23, the imaging information and the image estimation information being integrated. The visual environment parameter is supplied from the visual environment information analysis unit 25.

The physical property parameter on the subject contains depth and form information of the subject, lighting information at the time of imaging, material information of the subject, and reflection property information of the subject. The lighting information at the time of imaging can be information that is affected by the color of the subject and the like and is related to the subject or to the background of the subject. Hence, the lighting information at the time of imaging is also contained in the physical property parameter on the subject.

The visual environment parameter contains visual environment light information, a viewing time, and information on a subject of interest (line of sight).

Those pieces of information will be described below in the stated order. When the depth and form information indicates an uneven and dense form, as processing therefor, it is determined to perform shading (self shadow) emphasis. When the lighting information indicates a lighting color, as processing therefor, it is determined to perform a white balance adjustment corresponding to the lighting color.

When the lighting information indicates that an absolute luminance of the background is high and when the visual environment light information indicates that the environment is bright, as processing therefor, it is determined to perform a contrast adjustment based on a lightness function. When the lighting information indicates that an absolute luminance of the background is low and when the visual environment light information indicates that the environment is aright, as processing therefor, it is determined to increase a contrast based on the lightness function.

When the lighting information indicates that an absolute luminance of the background is high and when the visual environment light information indicates that the environment is dark, as processing therefor, it is determined to reduce a contrast based on the lightness function. When the lighting information indicates that an absolute luminance of the background is low and when the visual environment light information indicates that the environment is dark, as processing therefor, it is determined to perform a contrast adjustment based on the lightness function.

When the depth and form information indicates a sparse form and when the lighting information indicates a lighting direction, as processing therefor, it is determined to perform shading (cast shadow) emphasis.

When the reflection property information indicates that a specular reflection component is strong, as processing therefor, it is determined to synthesize the specular reflection component with emphasis. When the reflection property information indicates that a diffuse reflection component is strong, as processing therefor, it is determined to weaken the diffuse reflection component and emphasize the specular reflection component. It should be noted that the information on the material of the subject can be estimated based on the reflection property information. The information on the material, such as being metal, cloth, and the like, can also be estimated based on the image.

Hence, when the material information indicates a type of material, as processing therefor, it is determined to control the reflection property in accordance with the type of material. Alternatively, when the material information indicates a type of material, as processing therefor, it is determined to restore the texture in accordance with the type of material.

When the material information indicates that the material is metal, as processing therefor, it is determined to emphasize the specular reflection component. When the material information indicates that the material is wood, as processing therefor, it is determined to reduce the specular reflection component.

When the visual environment light information indicates that the environment is bright, as processing therefor, it is determined to perform display with brightness based on the lightness function. When the visual environment light information indicates that the environment is dark, as processing therefor, it is determined to perform display with less brightness based on the lightness function.

When the information on a subject of interest (line of sight) indicates a target area of the subject of interest, as processing therefor, it is determined to apply the above-mentioned control. When the information on a subject of interest (line of sight) indicates a non-target area of the subject of interest, as processing therefor, it is determined not to apply the above-mentioned control. Alternatively, when the information on a subject of interest (line of sight) indicates a non-target area of the subject of interest, as another processing therefor, it is determined to defocus. For example, information on visual attention can also be used.

When the viewing time is short, as processing therefor, it is determined to perform normal processing. When the viewing time is long, as processing therefor, it is determined to gradually reduce brightness and weaken processing.

Regarding the visual environment information, the property information of a display device can also be taken into consideration.

Hereinafter, specific configuration examples and processing examples corresponding to the processing details described above will be described.

2. First Embodiment (Configuration Example of Image Processing Apparatus)

Figure 5:
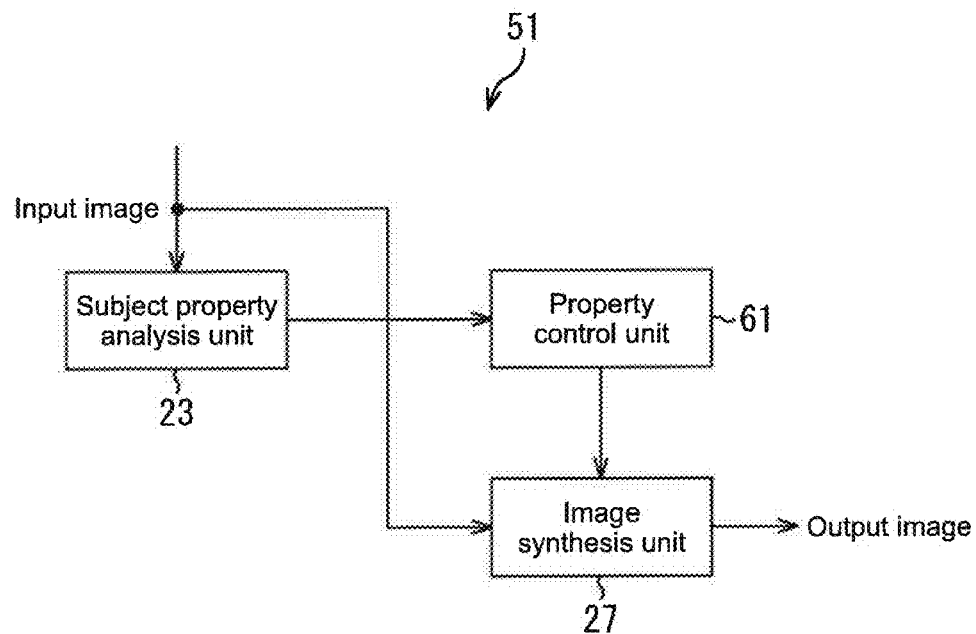
FIG. 5 is a block diagram showing a configuration example of an image processing apparatus according to a first embodiment.

FIG. 5 is a diagram showing a configuration of an image processing apparatus according to a first embodiment of the present disclosure. The example of FIG. 5 shows a configuration of an image processing apparatus that estimates reflection property based on an image and uses the reflection property for the texture control, to change the amount of illumination.

An image processing apparatus 51 shown in FIG. 5 has a configuration in common with the image processing apparatus 11 shown in FIG. 3 in that the subject property analysis unit 23 and the image synthesis unit 27 are provided.

The image processing apparatus 51 is different from the image processing apparatus 11 shown in FIG. 3 in that the imaging environment information acquisition unit 21, the imaging environment information analysis unit 22, the property information integration unit 24, and the visual environment information analysis unit 25 are eliminated. Further, the image processing apparatus 51 is different from the image processing apparatus 11 shown in FIG. 3 in that the property control unit 26 is replaced with a property control unit 61.

In other words, an input image of a camera at a previous stage (not shown) is supplied to the subject property analysis unit 23 and the image synthesis unit 27.

The subject property analysis unit 23 estimates and analyzes, as the property of a subject, for example, the reflection property of the subject based on the supplied input image. The subject property analysis unit 23 supplies the analyzed reflection property of the subject to the property control, unit 61 as a physical property parameter.

The property control unit 61 obtains the physical property parameter supplied from the subject property analysis unit 23 as a control parameter and determines processing details for controlling a texture based on the control parameter. Specifically, the property control unit 61 takes into consideration, as control parameters, a specular reflection component when the amount of reflected light, is large and the whole balance, based on the reflection, property of the subject, for example. As a result of the consideration, the property control unit 61 determines processing details for the texture control to adjust a diffuse reflection component when the amount of reflected light is small, and causes the image synthesis unit 27 to perform the determined texture control.

(Example of Image Processing)

Figure 6:
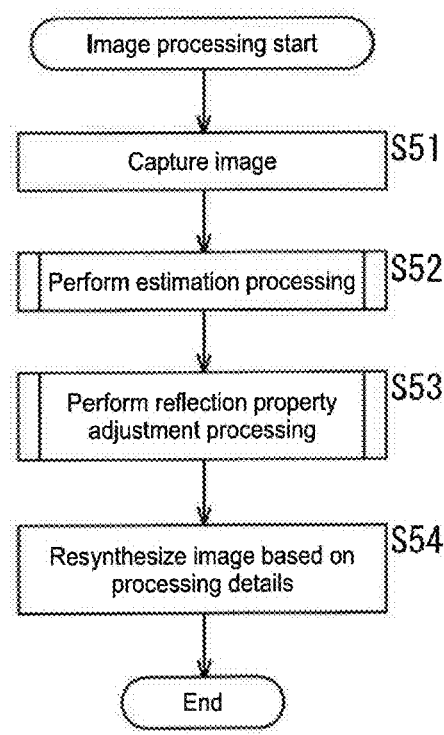
FIG. 6 is a flowchart for describing image processing of the image processing apparatus of FIG. 5.

Next, the image processing of the image processing apparatus 51 of FIG. 5 will be described with reference to a flowchart of FIG. 6.

In Step S51, the camera at the previous stage (not shown) captures an image. The input image from the camera at the previous stage (not shown) is supplied to the subject property analysis unit 23 and the image synthesis unit 27.

In Step S52, the subject property analysis unit 23 performs estimation processing to estimate the property of the subject based on the supplied input image. The estimation processing will be described with reference to FIG. 7. Through the processing in Step S52, the reflection property of the subject, which serves as the estimated physical property parameter, is supplied to the property control unit 61.

In Step S53, the property control unit 61 performs reflection property adjustment processing for the subject. The reflection property adjustment processing will be described later with reference to FIG. 8. Through the processing in Step S53, processing details for the texture control based on the reflection property are determined.

In Step S54, the image synthesis unit 27 resynthesized the input image used on the determined processing details for the texture control. In other words, in the example of FIG. 6, the reflection property of the image is adjusted and thus the texture of the image of the subject is controlled.

The resynthesis processing may be performed for each pixel sequentially or after pictures are fully prepared. It should be noted that a unit of processing will be the same hereinafter.

Figure 7:
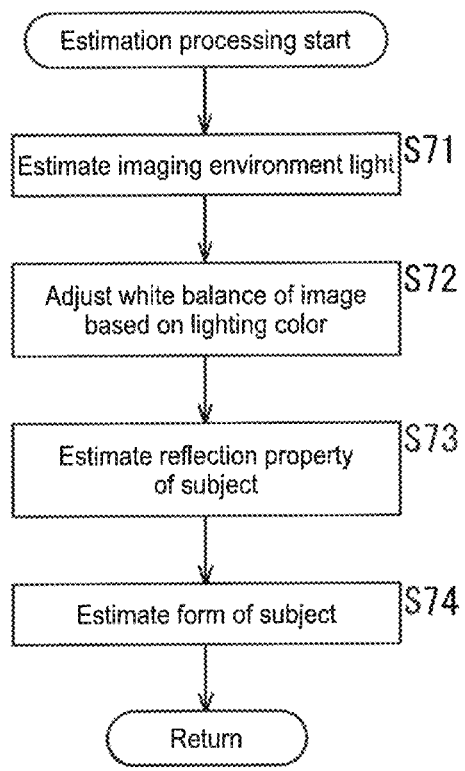
FIG. 7 is a flowchart for describing estimation processing.

Next, with reference to the flowchart of FIG. 7, the estimation processing in Step S52 of FIG. 6 will be described.

In Step S71, the subject property analysis unit 23 estimates and analyzes imaging environment light based on the supplied input image and as a result of the analysis, acquires information on the imaging environment light. The subject property analysis unit 23 supplies the information on the imaging environment light to the property control unit 61.

In Step S72, the property control unit 61 causes the image synthesis unit 27 to adjust white balance of the image, based on a lighting color acquired from the information on the imaging environment light. It should be rioted that the adjustment processing above may be performed at the timing of the reflection property adjustment processing in Step S53 of FIG. 6 described above, but it is desirable to perform the white balance adjustment prior to other adjustments, and thus such processing order is adopted.

In Step S73, the subject property analysis unit 23 estimates and analyzes the reflection property of the subject and supplies information on the analyzed reflection property to the property control unit 61.

In Step S74, the subject property analysis unit 23 estimates and analyzes the form of the subject and supplies information on the analyzed form of the subject to the property control unit 61.

In such a manner, the imaging environment light, the reflection property and the form of the subject, and the like, which are the property of the subject, are estimated based on the input image.

Next, the reflection property adjustment processing in Step S53 of FIG. 6 will be described with reference to the flowchart of FIG. 8.

In Step S91, the property control unit 61 determines whether the specular reflection component is large or not based on the information on the reflection property of the subject, which has been supplied from the subject property analysis unit 23. In Step S91, when it is determined that the specular reflection component is large, the processing proceeds to Step S92.

In Step S92, as texture control, the property control unit 61 determines to emphasize the specular reflection component indicating that the light is reflected. In Step S91, when it is determined that the specular reflection component is small, the processing proceeds to Step S93.

In Step S93, the property control unit 61 determines whether the diffuse reflection component is large or not. In Step S93, when it is determined that the diffuse reflection component as large, the processing proceeds to Step S94. In this case, the object may be whitish. Thus, in Step S94, as texture control, the property control unit 61 determines to reduce the diffuse reflection component.

In Step S93, when it is determined that the diffuse reflection component is small, the processing proceeds to Step S95. In Step S95, the property control unit 61 determines whether the adjustment of the reflection property for all the pixels is terminated or not.

In Step S95, when it is determined that the adjustment of the reflection property for all the pixels is terminated, the reflection property adjustment processing is terminated. In Step S95, when it is determined that the adjustment of the reflection property for all the pixels is not yet terminated, the processing returns to Step S91 and processing in Step S91 and subsequent processing are repeated.

Figure 8:
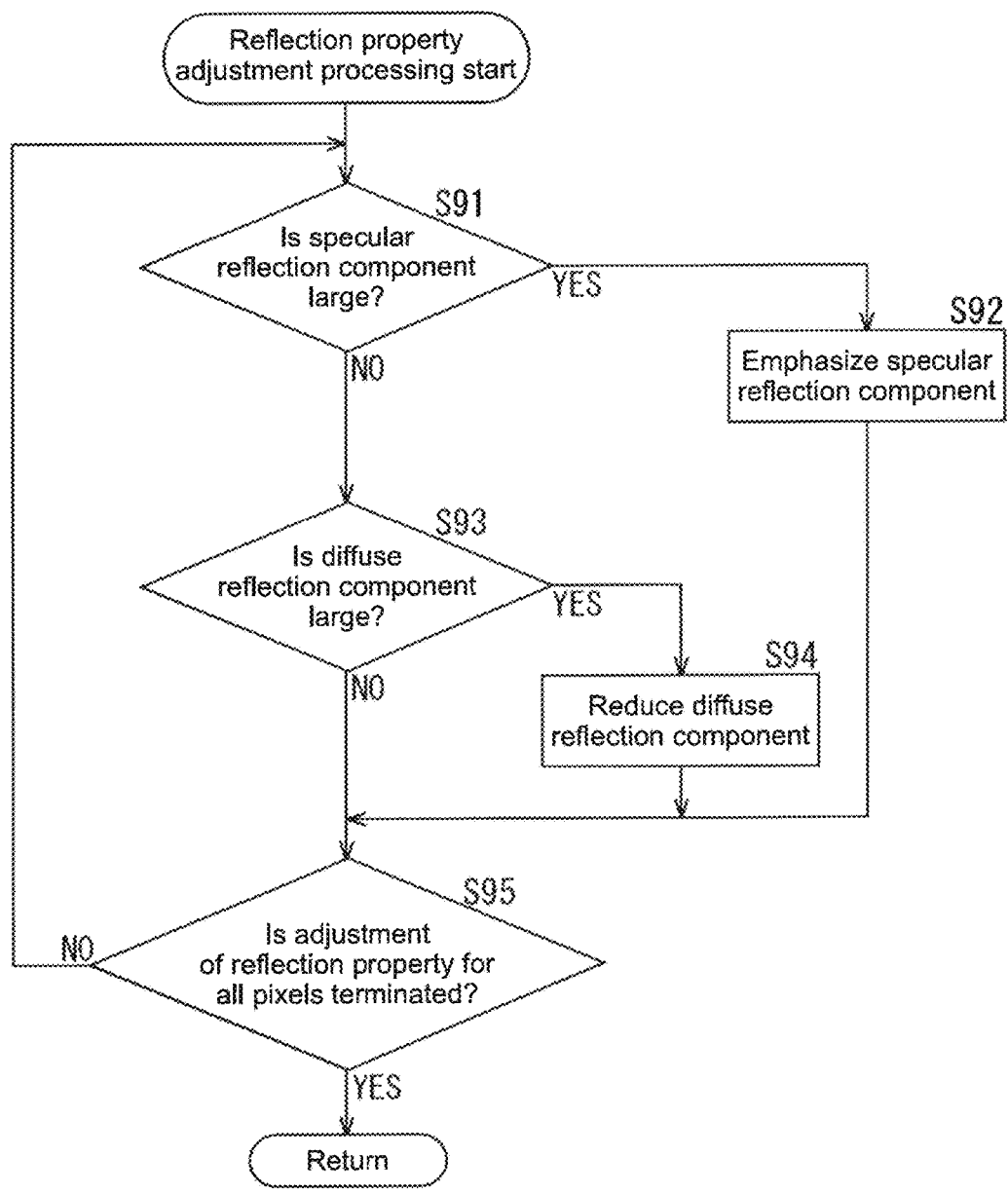
FIG. 8 is a flowchart for describing reflection property adjustment processing.

It should be noted that in the example of FIG. 8, if only the specular reflection is increased and thus the range of the image may be exceeded, the reflection property is adjusted while the diffuse reflection is also adjusted.

As described above, the reflection property of the image is adjusted and the texture of the image of the subject is controlled. This allows the optimization of the illumination light, the improvement of the luster, and the reproduction of the transparency in the image.

3. Second Embodiment (Configuration Example of Image Processing Apparatus)

Figure 9:
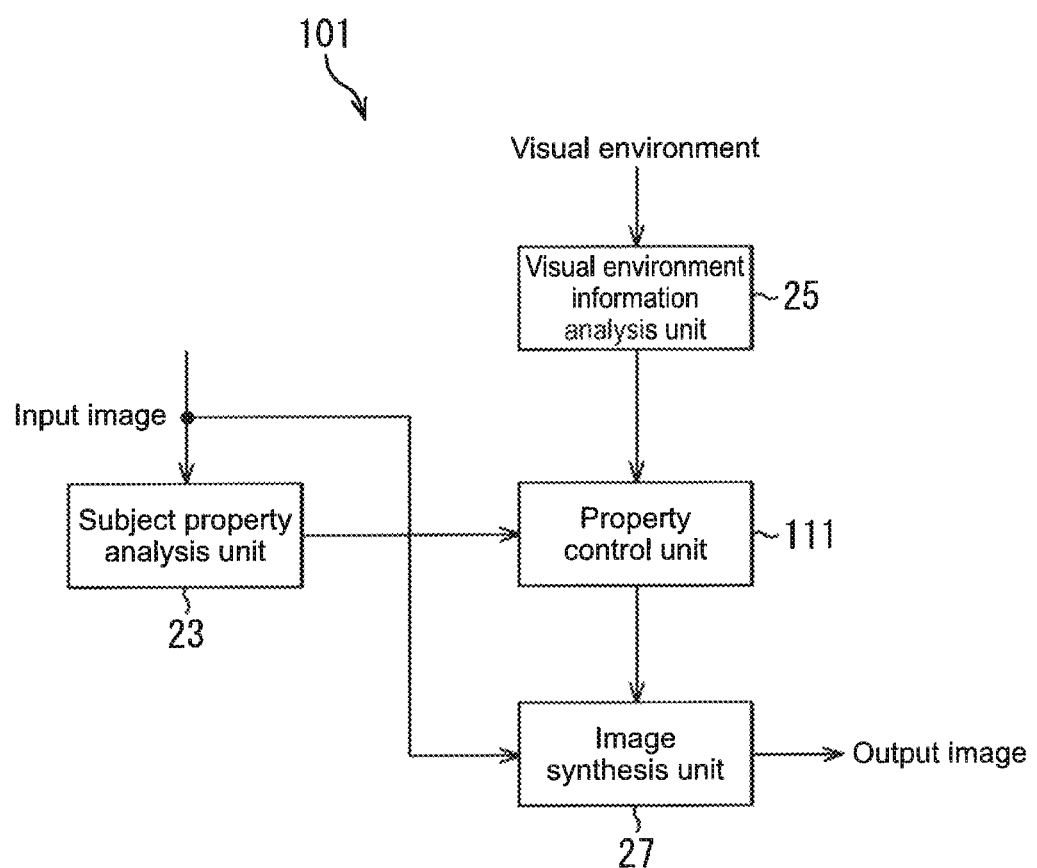
FIG. 9 is a block diagram showing a configuration example of an image processing apparatus according to a second embodiment.

FIG. 9 is a diagram showing a configuration of an image processing apparatus according to a second embodiment of the present disclosure. The example of FIG. 9 shows a configuration of an image processing apparatus that uses, for the texture control, information on a visual environment in addition to the reflection property estimated based on an image, to change the amount of illumination.

An image processing apparatus 101 shown in FIG. 9 has a configuration in common with the image processing apparatus 11 shown in FIG. 3 in that the subject property analysis unit 23, the visual environment information analysis unit 25, and the image synthesis unit 27 are provided.

The image processing apparatus 101 is different from the image processing apparatus 11 shown in FIG. 3 in that the imaging environment information acquisition unit 21, the imaging environment information analysis unit 22, and the property information integration unit 24 are eliminated. Further, the image processing apparatus 101 is different from the image processing apparatus 11 shown in FIG. 3 in that the property control unit 26 is replaced with a property control unit 111.

In other words, an input image of a camera at a previous stage (not shown) is supplied to the subject property analysis unit 23 and the image synthesis unit 27.

The subject property analysis unit 23 estimates and analyzes, as the property of a subject, for example, the reflection property of the subject based on the supplied input image. Further, the subject property analysis unit 23 estimates and analyzes, as the property of the subject, for example, absolute luminance information of the image at the time of imaging. The subject property analysis unit 23 supplies the analyzed property of the subject to the property control unit 111 as a physical property parameter.

The visual environment information analysis unit 25 acquires, for example, information, on visual environment light as information on a visual environment in which images are viewed, and analyzes the acquired information. The visual, environment information analysis unit 25 supplies the analyzed information on the visual environment light to the property control unit 111 as a visual environment parameter.

The property control unit 111 determines processing details for controlling the texture, based on the physical property parameter supplied from the subject property analysis unit 23. Specifically, the property control unit 111 determines processing details for the texture control to take into consideration the specular reflection component and the whole balance to adjust the diffuse reflection component as well based on, for example, the reflection property of the subject as a physical property parameter. The property control unit 111 causes the image synthesis unit 27 to perform the determined texture control.

Further, the property control unit 111 causes the image synthesis unit 27 to perform the texture control in accordance with the visual environment parameter supplied from the visual environment information analysis unit 25, to optimize the texture control. Specifically, the property control unit 111 determines processing details for the texture control to adjust a contrast in accordance with, for example, the illumination light (visual environment light) at the time of viewing, as a visual environment parameter, and causes the image synthesis unit 27 to perform the determined texture control.

Figure 10:
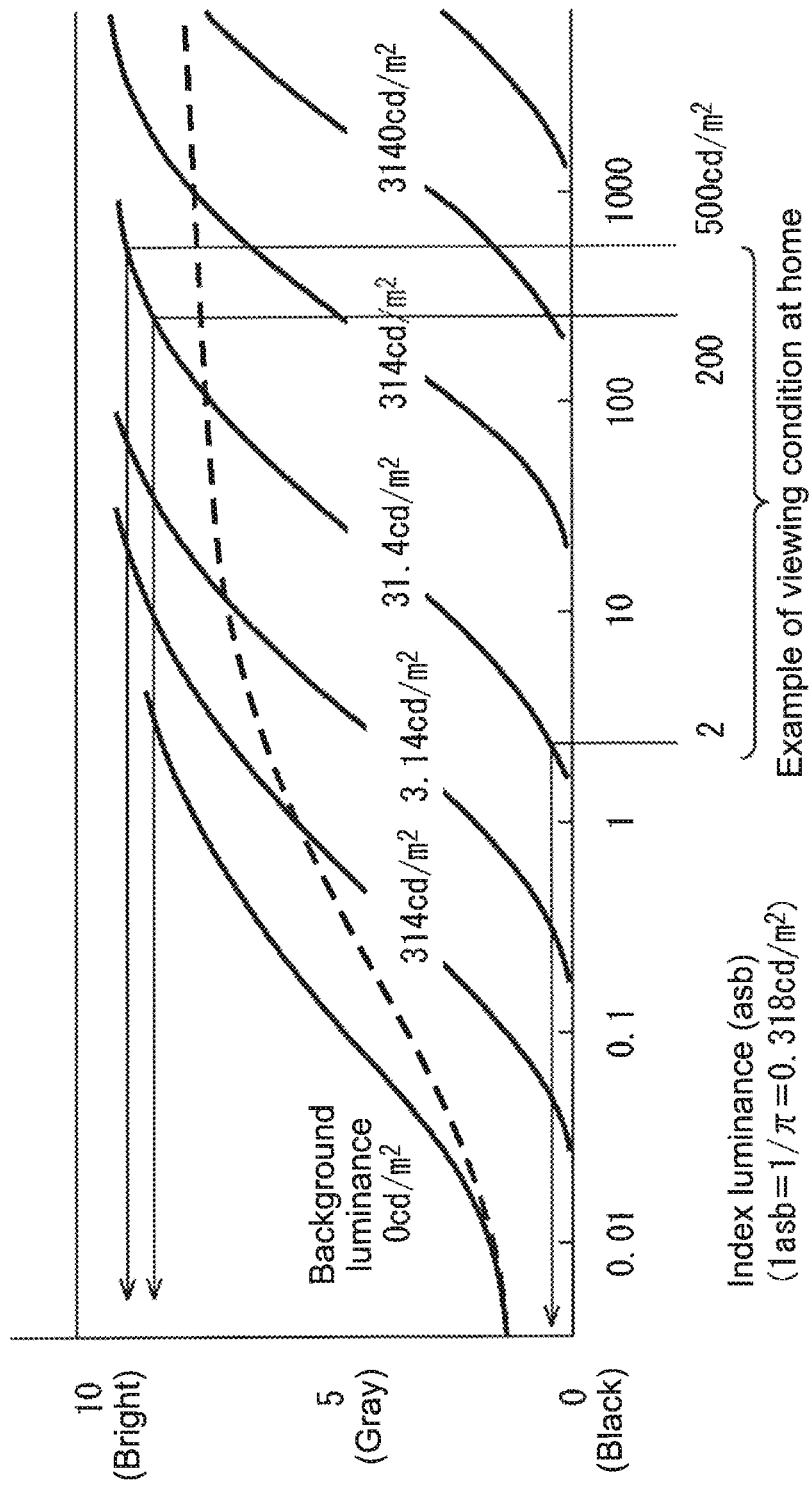
FIG. 10 is a diagram showing a relationship between a luminance and a subjective brightness level.

FIG. 10 is a diagram showing a relationship between a luminance and a subjective brightness level.

In the example of FIG. 10, the horizontal axis indicates a luminance of the visual environment light (the right-hand side of the horizontal axis indicates brighter light), and the vertical axis indicates the brightness and darkness that a human perceives.

For example, when a human views an image of 314 $cd/m^2$ under a visual environment of 200 $cd/m^2$, the human feels the image to be bright at a middle level between dark and bright. For example, when the human views an image of 314 $cd/m^2$ under a visual environment of 500 $cd/m^2$, the human feels the image to be brighter than in the case of the visual environment of 200 $cd/m^2$.

In such a manner, the improvement of the texture is affected by the influence of the illumination light at the time of viewing. Further, it is also found from FIG. 10 that the reproducibility of black is important to improve the texture. From the above fact, in the image processing apparatus 101, the information on the visual environment is also used for the texture control.

(Example of Image Processing)

Figure 11:
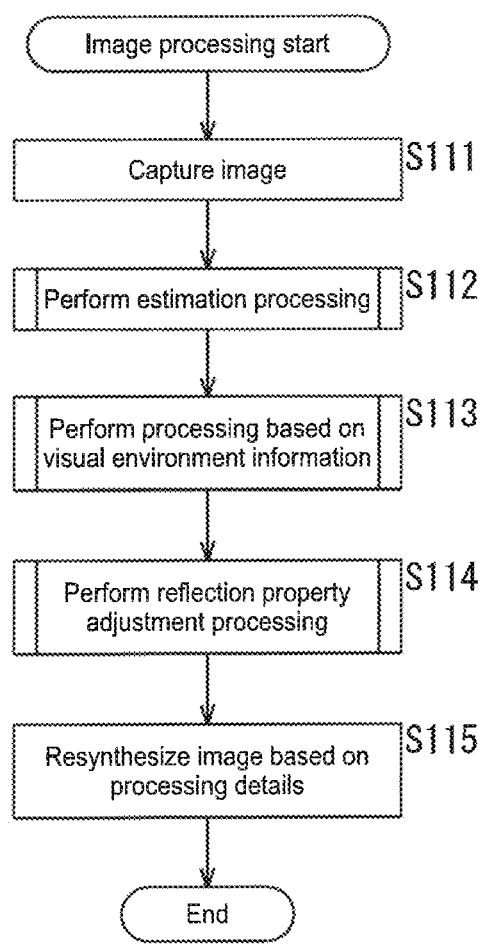
FIG. 11 is a flowchart for describing image processing of the image processing apparatus of the FIG. 9.

Next, the image processing of the image processing apparatus 101 of FIG. 9 will be described with reference to a flowchart of FIG. 11.

In Step S111, the camera at the previous stage (not shown) captures an image. The input image from the camera at the previous stage (not shown) is supplied to the subject property analysis unit 23 and the image synthesis unit 27.

In Step S112, the subject property analysis unit 23 performs estimation processing to estimate the property of the subject based on the supplied input image. The estimation processing is basically the same processing as that described above with reference to FIG. 7 and thus its description will be omitted to avoid the repetition. Through the processing in Step S112, the reflection property of the subject, which serves as the estimated physical property parameter, is supplied to the property control unit 111. Although not being estimated in the example of FIG. 7, for example, absolute luminance information of the image at the time of imaging is also estimated as the property of the subject and supplied to the property control unit 111.

In Step S113, the visual environment information analysis unit 25 and the property control unit 111 perform processing based on visual environment information that indicates an environment in which images are viewed. The processing based on the visual environment information will be described later with reference to FIG. 12. Through the processing in Step S113, processing details for the to control based on the visual environment information are determined.

Further, in Step S114, the property control unit 111 performs reflection property adjustment processing for the subject. The reflection property adjustment processing is basically the same processing as that described above with reference to FIG. 8 and this its description will be omitted to avoid the repetition. Through the processing in Step S114, processing details for the texture control based on the reflection property are determined.

In Step S115, the image synthesis unit 27 resynthesizes the input image based on the determined processing details for the texture control. In other words, in the example of FIG. 11, the contrast of the visual environment light and the reflection property of the image are adjusted, and thus the texture of the image of the subject is controlled.

Figure 12:
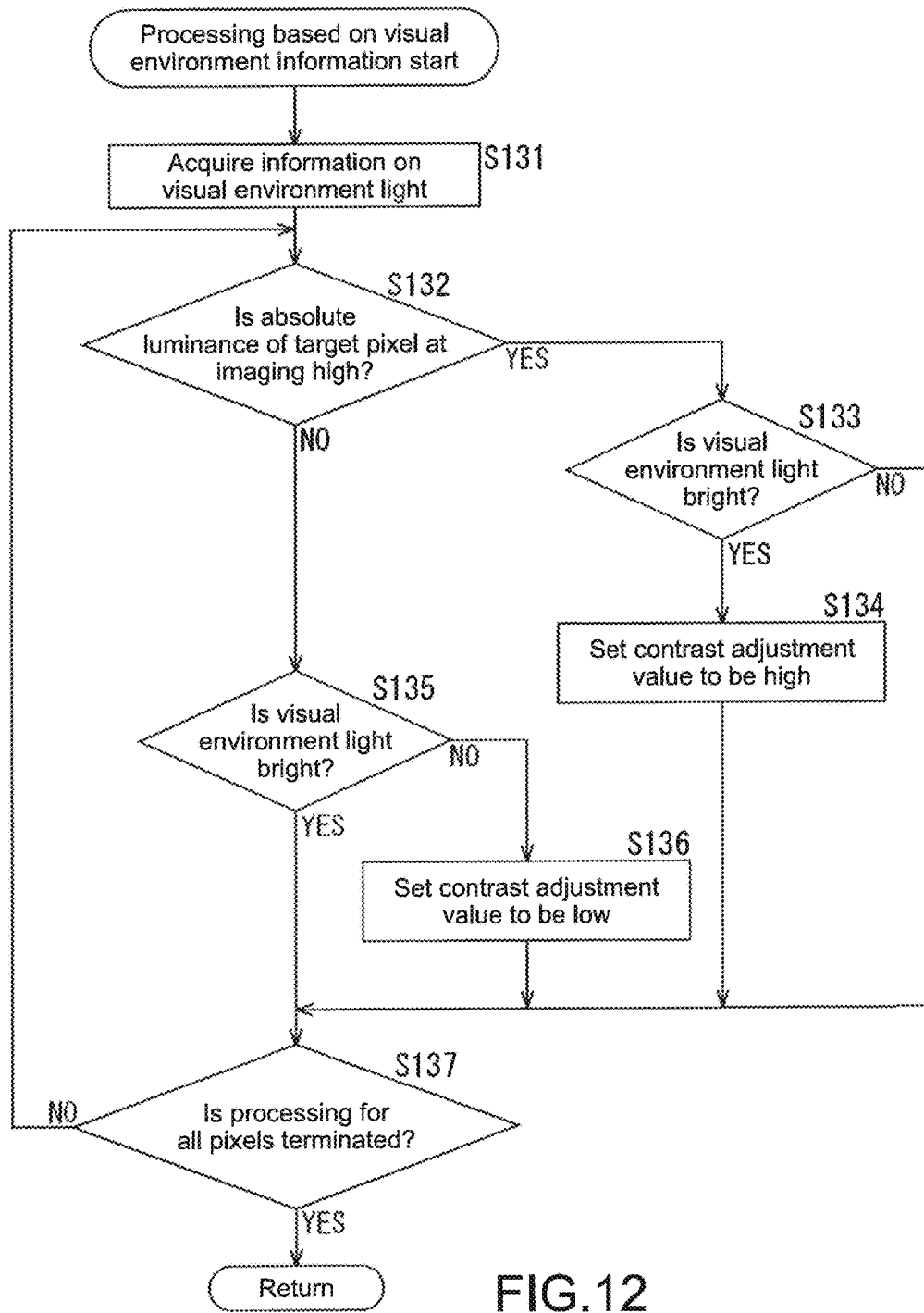
FIG. 12 is a flowchart for describing processing based on visual environment information.

Next, with reference to a flowchart of FIG. 12, processing based on the visual environment information in Step S113 of FIG. 11 will be described.

In Step S131, the visual environment information analysis unit 25 acquires, for example, information on visual environment light as information on a visual environment in which, images are viewed, and analyzes the acquired information. The visual environment information analysis unit 25 supplies the analyzed information on the visual environment light to the property control unit 111 as a visual environment parameter.

Absolute luminance information of the image at the time of imaging is also estimated based on the subject property analysis unit 23 and supplied to the property control unit 111. In Step S132, the property control unit 111 determines whether an absolute luminance of a target pixel at the time of imaging is higher than a predetermined luminance value or not. In Step S132, when it is determined that an absolute luminance of a target pixel at the time of imaging is higher than a predetermined luminance value, the processing proceeds to Step S133.

In Step 2133, the property control unit 111 refers to the visual environment parameter supplied, from the visual environment information analysis unit 25 and determines whether the visual environment light is brighter than a predetermined value. In Step S133, when it is determined that the visual environment light is brighter than a predetermined value, the processing proceeds to Step S134. In this case, since the image may appear dark, in Step S134, the property control unit 111 controls, as texture control, the image synthesis unit 27 to set a contrast adjustment value to be high.

In Step S133, when it is determined that the visual environment light is darker than a predetermined value, Step S134 is skipped and the processing proceeds to Step S137.

In Step S132, when it is determined that an absolute luminance of a target pixel at the time of imaging is low, the processing proceeds to Step S135. In Step S135, the property control unit 111 refers to the visual environment parameter supplied from the visual environment information analysis unit 25 and determines whether the visual environment light is brighter than a predetermined value or not.

In Step S135, when it is determined that the visual environment light is darker than a predetermined value, the processing proceeds to Step S136. In Step S136, the property control unit 111 controls, as texture control, the image synthesis unit 27 to set a contrast adjustment value to be low.

In Step S135, when it is determined that the visual environment, light is brighter than a predetermined value, Step S136 is skipped and the processing proceeds to Step S137.

In Step S137, the property control unit 111 determines whether the adjustment of the reflection property for all the pixels is terminated or not.

In Step S137, when it is determined that the processing for all the pixels is terminated, the processing based on the visual environment information is terminated. In Step S137, when it is determined that the processing for all the pixels is not yet terminated, the processing returns to Step S132 and processing. In Step S132 and subsequent processing are repeated.

As described above, the contrast is adjusted used on the visual environment and the reflection property of the image is adjusted, and thus the texture of the image of the subject is controlled. This allows the optimization of the illumination light, the improvement of the luster, and the reproduction of the transparency in the image.

4. Third Embodiment (Configuration Example of Image Processing Apparatus)

Figure 13:
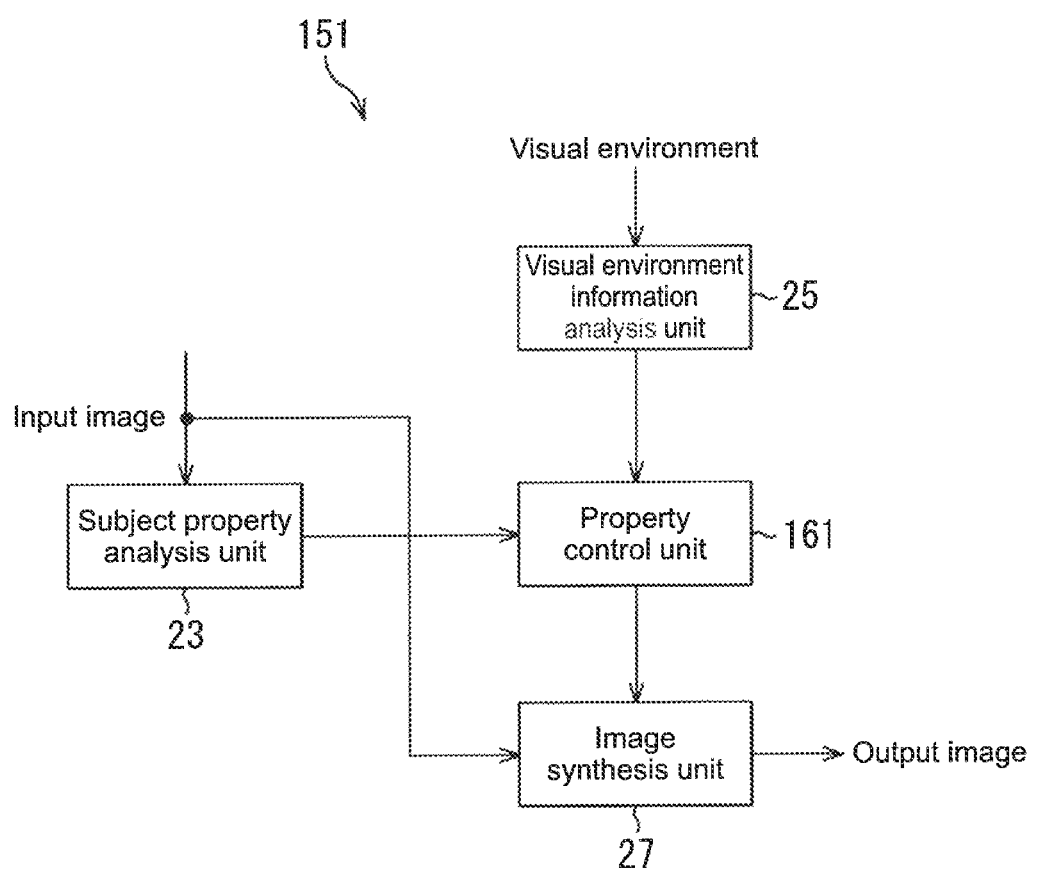
FIG. 13 is a block diagram showing a configuration example of an image processing apparatus according to a third embodiment.

FIG. 13 is a diagram showing a configuration of an image processing apparatus according to a third embodiment of the present disclosure. The example of FIG. 13 shows a configuration of an image processing apparatus that uses, for the texture control, information on the line of sight, in addition to the reflection property estimated based on an image and to the information on a visual environment.

An image processing apparatus 151 shown in FIG. 13 has a configuration in common with the image processing apparatus 11 shown in FIG. 3 in that the subject property analysis unit 23, the visual environment information analysis unit 25, and the image synthesis unit 27 are provided.

The image processing apparatus 151 is different from the image processing apparatus 11 shown in FIG. 3 in that the imaging environment information acquisition unit 21, the imaging environment information analysis unit 22, and the property information integration unit 24 are eliminated. Further, the image processing apparatus 151 is different from the image processing apparatus 11 shown in FIG. 3 in that the property control unit 26 is replaced with a property control unit 161.

In other words, an input image of a camera at a previous stage (not shown) is supplied to the subject property analysis unit 23 and the image synthesis unit 27.

The subject property analysis unit 23 estimates and analyzes, as the property of a subject, for example, the reflection property of the subject based on the supplied input image. Further, the subject property analysis unit 23 estimates and analyzes, as the property of the subject, for example, absolute luminance information of the image at the time of imaging. The subject property analysis unit 23 supplies the analyzed property of the subject to the property control unit 161 as a physical property parameter.

The visual environment information analysis unit 25 acquires, for example, information on visual environment light as information on a visual, environment in which images are viewed, and analyzes the acquired information. Further, the visual environment information analysis unit 25 acquires and analyzes, as the information on the visual environment, for example, information on visual property (contrast sensitivity function (CSF)), a subject of interest, and the line of sight. The visual environment information analysis unit 25 supplies the analyzed information on the visual environment to the property control unit 161 as a visual environment parameter.

The property control unit 161 determines processing details for controlling the texture, based on the physical property parameter supplied from the subject property analysis unit 23. Specifically, the property control unit 161 determines processing details for the texture control to take into consideration the specular reflection component and the whole balance to adjust the diffuse reflection component as well based on, for example, the reflection property of the subject as a physical property parameter. The property control unit 161 causes the image synthesis unit 27 to perform the determined texture control.

The property control unit 161 causes the image synthesis unit 27 to perform the texture control in accordance with the visual environment, parameter supplied from the visual environment information analysis unit 25, to optimize the texture control. Specifically, the property control unit 161 determines processing details for the texture control to adjust a contrast in accordance with, for example, the illumination light (visual environment light) at the time of viewing, as a visual environment parameter, and causes the image synthesis unit 27 to perform the determined texture control. Further, the property control unit 161 determines processing details for the texture control to adjust an image quality adjustment value in accordance with, for example, the information on the line of sight as a visual environment parameter and causes the image synthesis unit 27 to perform the determined texture control.

(Example of Image Processing)

Figure 14:
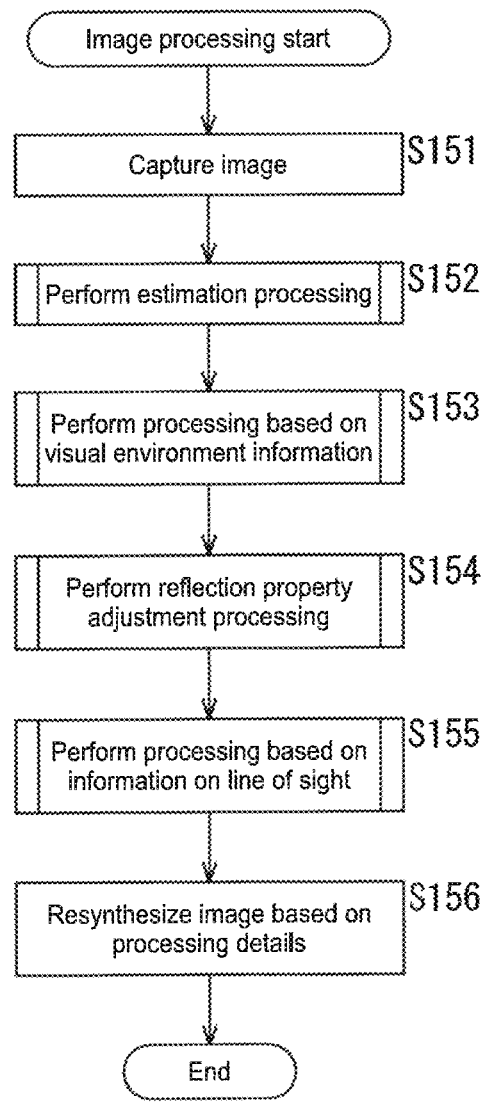
FIG. 14 is a flowchart for describing image processing of the image processing apparatus of FIG. 13.

Next, the image processing of the image processing apparatus 151 of FIG. 13 will be described with reference to the flowchart of FIG. 14.

In Step S151, the camera at the previous stage (not shown) captures an image. The input image from the camera at the previous stage (not shown) is supplied to the subject property analysis unit 23 and the image synthesis unit 27.

In Step S152, the subject property analysis unit 23 performs estimation processing to estimate the property of the subject based on the supplied input image. The estimation processing is basically the same processing as that described above with reference to FIG. 7 and thus its description will be omitted to avoid the repetition. Through the processing in Step S152, the reflection property of the subject, which serves as the estimated physical property parameter, is supplied to the property control, unit 161. Although not being estimated in the example of FIG. 7, for example, absolute luminance information of the image at the time of imaging is also estimated as the property of the subject and supplied to the property control unit 161.

In Step S153, the visual environment information analysis unit 25 and the property control unit 161 perform processing based on visual environment information that indicates an environment in which images are viewed. The processing based on the visual environment information is basically the same processing as that described above with reference to FIG. 12 and thus its description will be omitted to avoid the repetition. Through the processing in Step S153, processing details for the texture control based on the visual environment information are determined.

In Step S154, the property control unit 161 performs reflection property adjustment processing for the subject. The reflection property adjustment processing is basically the same processing as that described above with reference to FIG. 8 and thus its description will be omitted to avoid the repetition. Through the processing in Step S154, processing details for the texture control based on the reflection property are determined.

Further, in Step S155, the visual environment information analysis unit 25 and the property control unit 161 perform processing based on information on the line of sight. The processing based on the information on the line of sight will be determined later with reference to FIG. 15. Through the processing in Step S155, processing details for the texture control based on the information on the line of sight are determined.

In Step S156, the image synthesis unit 27 resynthesizes the input image based on the determined processing details for the texture control. In other words, in the example of FIG. 14, the contrast of the visual environment light and the reflection property of the image are adjusted, and an adjustment value based on the information on the line of sight is reconfigured. Thus, the texture of the image of the subject is controlled.

Figure 15:
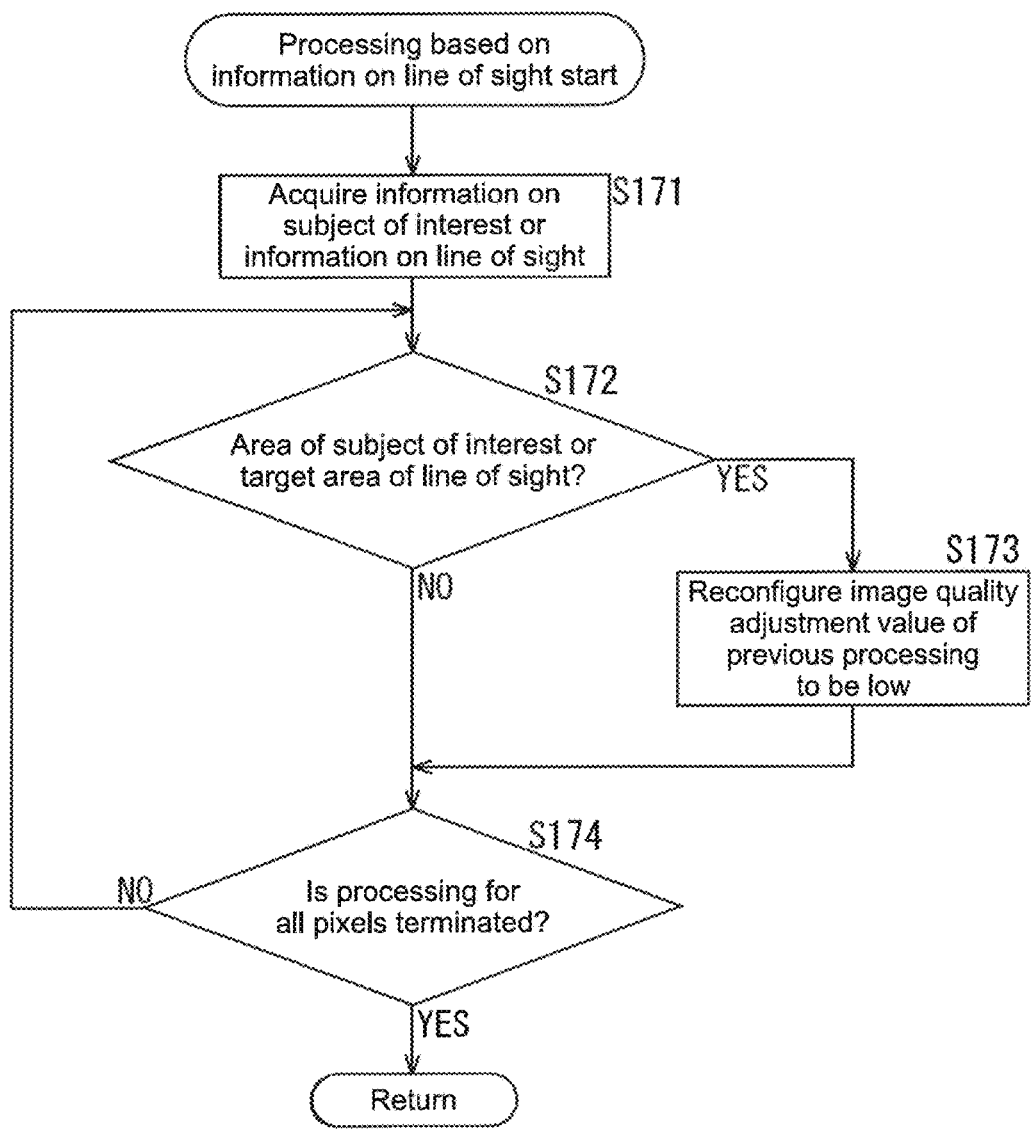
FIG. 15 is a flowchart for describing processing based on information on the line of sight.

Next, the processing based on the information on the line of sight in Step S155 of FIG. 14 will be described with reference to a flowchart of FIG. 15.

In Step S171, the visual environment information analysis unit 25 acquires, for example, information on the subject of interest or the information on the line of sight, as information on a visual environment, and analyzes the acquired information. The visual environment information analysis unit 25 supplies the analyzed information on the visual environment to the property control unit 161 as a visual environment parameter.

In Step S172, the property control unit 161 determines whether a target pixel is located in an area of the subject of interest or in a target area of the line of sight. In Step S172, when it is determined that a target pixel is located in an area of the subject of interest or in a target area of the line of sight, the processing proceeds to Step S173.

In Step S173, the property control unit 161 controls, as texture control, the image synthesis unit 27 to reconfigure an image quality adjustment value of the previous processing (in other words, processing based on the visual environment information, the reflection property, and the information on the line of sight) to be low.

In Step S172, when it is determined that a target pixel is not located in an area of the subject of interest or in a target area of the line of sight, Step S173 is skipped and the processing proceeds to Step S174.

In Step S174, the property control unit 161 determines whether the processing for all the pixels is terminated or not.

In Step S174, when it is determined that the processing for all the pixels is terminated, the processing based on the information on the line of sight is terminated. In Step S174, when it is determined that the processing for all the pixels is not yet terminated, the processing returns to Step S172 and processing in Step S172 and subsequent processing are repeated.

As described above, the contrast is adjusted based on the visual environment and the reflection property of the image is adjusted, and thus the texture of the image of the subject is controlled. This allows the optimization of the illumination light, the improvement of the luster, and the reproduction of the transparency in the image.

5. Fourth Embodiment (Configuration Example of Image Processing Apparatus)

Figure 16:
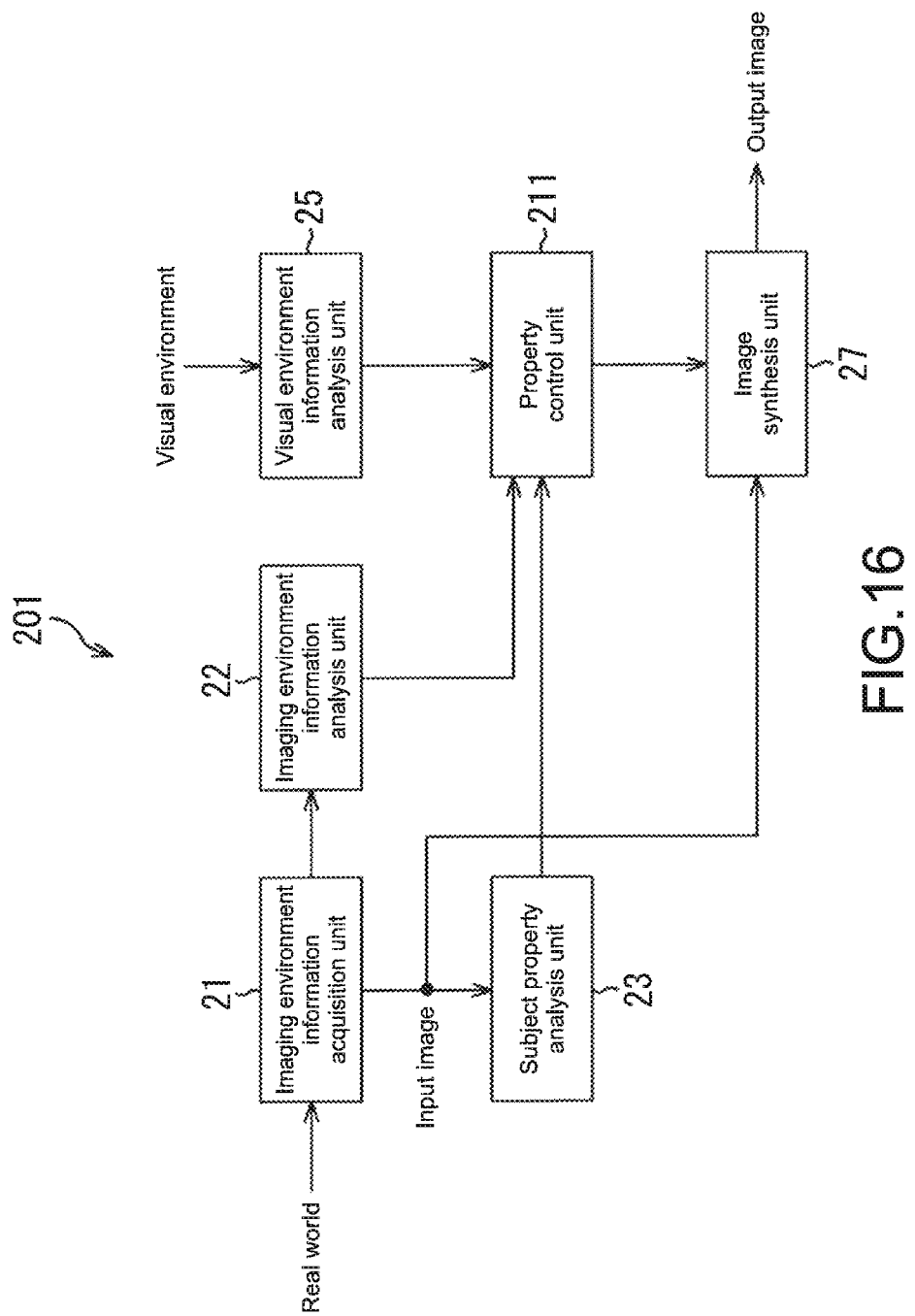
FIG. 16 is a block diagram showing a configuration example of an image processing apparatus according to a fourth embodiment.

FIG. 16 is a diagram showing a configuration of an image processing apparatus according to a fourth embodiment of the present disclosure. The example of FIG. 16 shows a configuration of an image processing apparatus that uses, for the texture control, the physical property parameter acquired at the time of imaging, in addition to the physical property parameter estimated based on an image.

An image processing apparatus 201 shown in FIG. 16 has a configuration in common with the image processing apparatus 11 shown in FIG. 3 in that the imaging environment information acquisition unit 21, the imaging environment information analysis unit 22, the subject property analysis unit 23, the visual environment information analysis unit 25, and the image synthesis unit 27 are provided.

The image processing apparatus 201 is different from the image processing apparatus 11 shown in FIG. 3 in that the property information integration unit 24 is eliminated. Further, the image processing apparatus 201 is different from the image processing apparatus 11 shown in FIG. 3 in that the property control unit 26 is replaced with a property control unit 211.

In other words, the imaging environment information acquisition unit 21 captures an image of a subject, inputs the image of the subject, and supplies the input image to the subject property analysis unit 23 and the image synthesis unit 27. Further, the imaging environment information acquisition unit 21 acquires imaging information on an environment and the subject at the time of imaging of the subject and supplies the acquired imaging information to the imaging environment information analysis unit 22.

The imaging environment information analysis unit 22 analyzes the imaging information that has been acquired from the imaging environment information acquisition unit 21 at the time of imaging, and supplies the analyzed imaging information to the property control unit 211 as a physical property parameter.

The subject property analysis unit 23 estimates and analyzes, as the property of the subject, for example, the reflection property of the subject based on the supplied input image. Further, the subject property analysis unit 23 estimates and analyzes, as the property of the subject, for example, absolute luminance information of the image at the time of imaging. The subject property analysis unit 23 supplies the analyzed property of the subject to the property control unit 211 as a physical property parameter.

The visual environment information analysis unit 25 acquires, for example, information on visual environment light as information on a visual environment in which images are viewed, and analyzes the acquired information.

The property control unit 211 determines processing details for controlling the texture based on the physical property parameter supplied from the subject property analysis unit 23. At that time, the property control unit 211 also refers to the physical property parameter acquired from the imaging environment information analysis unit 22 at the time of imaging, to determine the processing details. It should be noted that at least one of the physical property parameters of the imaging environment information analysis unit 22 and the subject property analysis unit 23 may be referred to. For example, a physical property parameter with higher reliability is used.

Specifically, the property control unit 211 determines processing details for controlling the texture to take into consideration the specular reflection component and the whole balance to adjust the diffuse reflection component as well based on, for example, the reflection property of the subject as a physical property parameter. The property control unit 211 causes the image synthesis unit 27 to perform the determined texture control.

The property control unit 211 causes the image synthesis unit 27 to perform the texture control in, accordance with the visual environment parameter supplied from the visual environment information analysis unit 25, to optimize the texture control. Specifically, the property control unit 211 determines processing details for the texture control to adjust a contrast in accordance with, for example, the illumination light (visual environment light) at the time of viewing as a visual environment parameter, and causes the image synthesis unit 27 to perform the determined texture control.

(Example of Image Processing)

Figure 17:
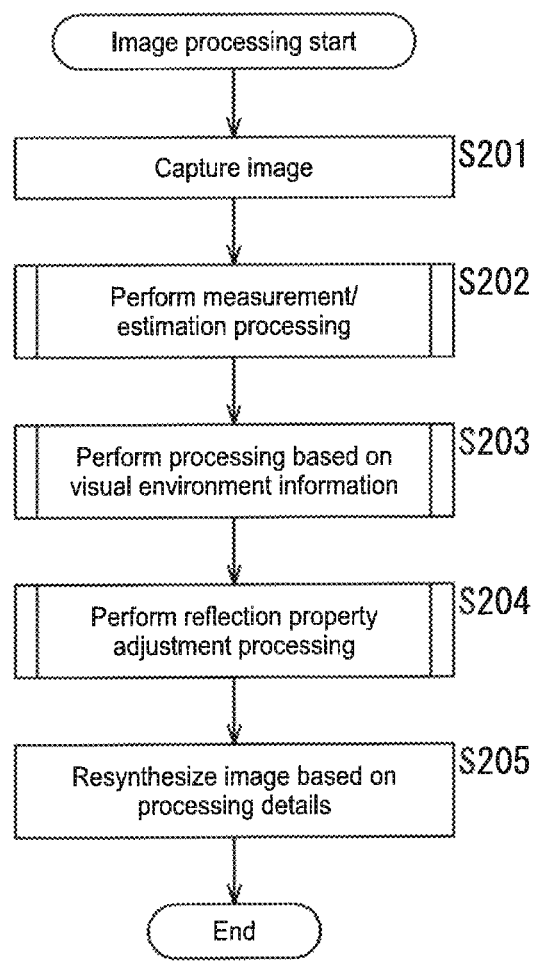
FIG. 17 is a flowchart for describing image processing of the image processing apparatus of FIG. 16.

Next, the image processing of the image processing apparatus 201 of FIG. 16 will, be described with reference to the flowchart of FIG. 17.

In Step S201, the imaging environment information acquisition unit 21 captures an image of the subject and inputs the image of the subject. The imaging environment information acquisition unit 21 supplies the input image to the subject property analysis unit 23 and the image synthesis unit 27.

In Step S202, the imaging environment information acquisition unit 21, the imaging environment information analysis unit 22, and the subject property analysis unit 23 perform measurement/estimation processing. The measurement/estimation processing will be described later with reference to FIG. 18. Through the processing in Step S202, the measured physical property parameter and the estimated physical property parameter (such as the reflection property of the subject, the imaging environment light, and the form of the subject) are supplied to the property control unit 211.

In Step S203, the visual environment information analysis unit 25 and the property control unit 211 perform processing based on visual environment information that indicates an environment in which images are viewed. The processing based on the visual environment information is basically the same processing as that described above with reference to FIG. 12 and thus its description will be omitted to avoid the repetition. Through the processing in Step S203, processing details for the texture control based on the visual environment information are determined.

In Step S204, the property control unit 211 performs reflection property adjustment processing for the subject. The reflection property adjustment processing is basically the same processing as that described above with reference to FIG. 8 and thus its description will be omitted to avoid the repetition. In this case, the reflection property to be referred to is at least one of the measured property and the estimated property. Through the processing in Step S204, processing details for the texture control, based on the reflection property are determined.

In Step S205, the image synthesis unit 27 resynthesizes the input image based on the determined processing details for the texture control. In other words, in the example of FIG. 17, the contrast of the measured visual environment light and the reflection property of the image are adjusted, and thus the texture of the image of the subject is controlled.

Figure 18:
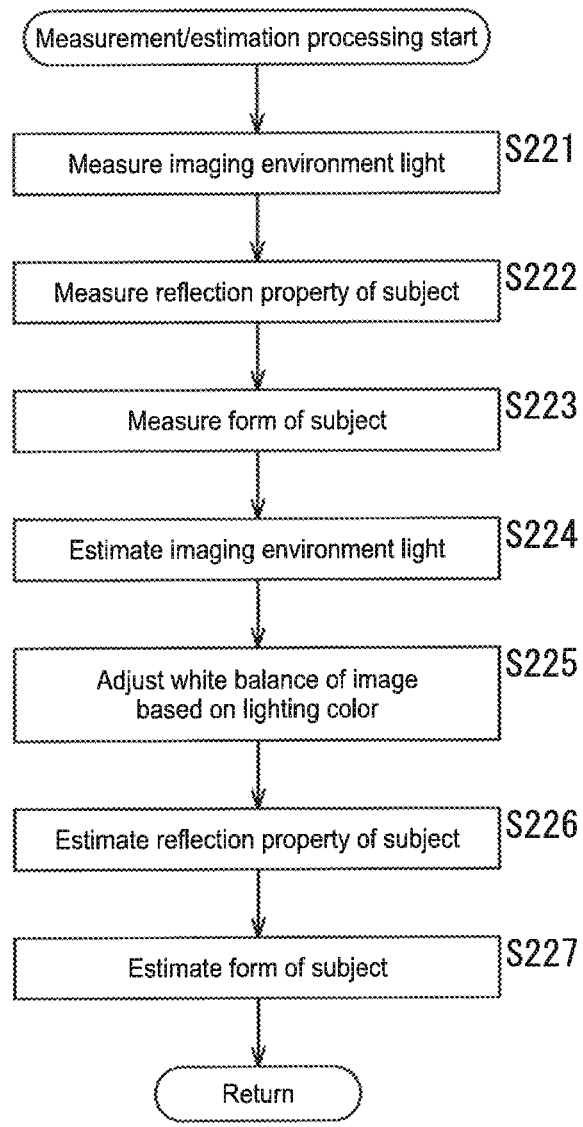
FIG. 18 is a flowchart for describing measurement/estimation processing.

Next, the measurement/estimation processing in Step S202 of FIG. 17 will be described with reference to the flowchart of FIG. 18.

In Step S221, the imaging environment information acquisition unit 21 measures imaging environment light and supplies the measured imaging environment, light to the imaging environment information analysis unit 22. The imaging environment information analysis unit 22 analyzes the imaging environment light supplied from the imaging environment information acquisition unit 21 and as a result of the analysis, supplies information on the imaging environment light to the property control unit 211 as a physical property parameter.

In Step S222, the imaging environment information acquisition unit 21 measures the reflection property of the subject and supplies the measured reflection property of the subject to the imaging environment information analysis unit 22. The imaging environment information analysis unit 22 analyzes the reflection property of the subject that has been supplied from the imaging environment information acquisition unit 21 and supplies the analyzed reflection property of the subject to the Property control unit 211 as a physical property Parameter.

In Step S223, the imaging environment information acquisition unit 21 measures the form of the subject and supplies the measured form of the subject to the imaging environment information analysis unit 22. The imaging environment information analysis unit 22 analyzes the form of the subject that has been supplied from the imaging environment information acquisition unit 21 and supplies the analyzed form of the subject to the property control unit 211 as a physical property parameter.

In Step S224, the subject property analysis unit 23 estimates and analyzes imaging environment light based on the supplied input image and as a result of the analysis, acquires information on the imaging environment light. The subject property analysis unit 23 supplies the information on the illumination light to the property control unit 211.

In Step S225, the property control unit 211 causes the image synthesis unit 27 to adjust white balance of the image, based on a lighting color acquired from the information on the imaging environment light. It should be noted that the adjustment processing above may be performed at the timing of the reflection property adjustment processing in Step S204 of FIG. 17 described above, but it is desirable to perform the white balance adjustment prior to other adjustments, and thus such processing order is adopted.

In Step S226, the subject property analysis unit 23 estimates and analyzes the reflection property of the subject and supplies information on the analyzed reflection property to the property control unit 211.

In Step S227, the subject property analysis unit 23 estimates and analyzes the form of the subject and supplies information on the analyzed form of the subject to the property control unit 211.

In such a manner, the illumination light, the reflection property and the form of the subject, and the like, which are property of the subject, are measured at the time of imaging. Further, the illumination light, the reflection property and the form of the subject, and the like, which are property of the subject, are estimated based on the input image.

6. Fifth Embodiment (Configuration Example of Image Processing Apparatus)

Figure 19:
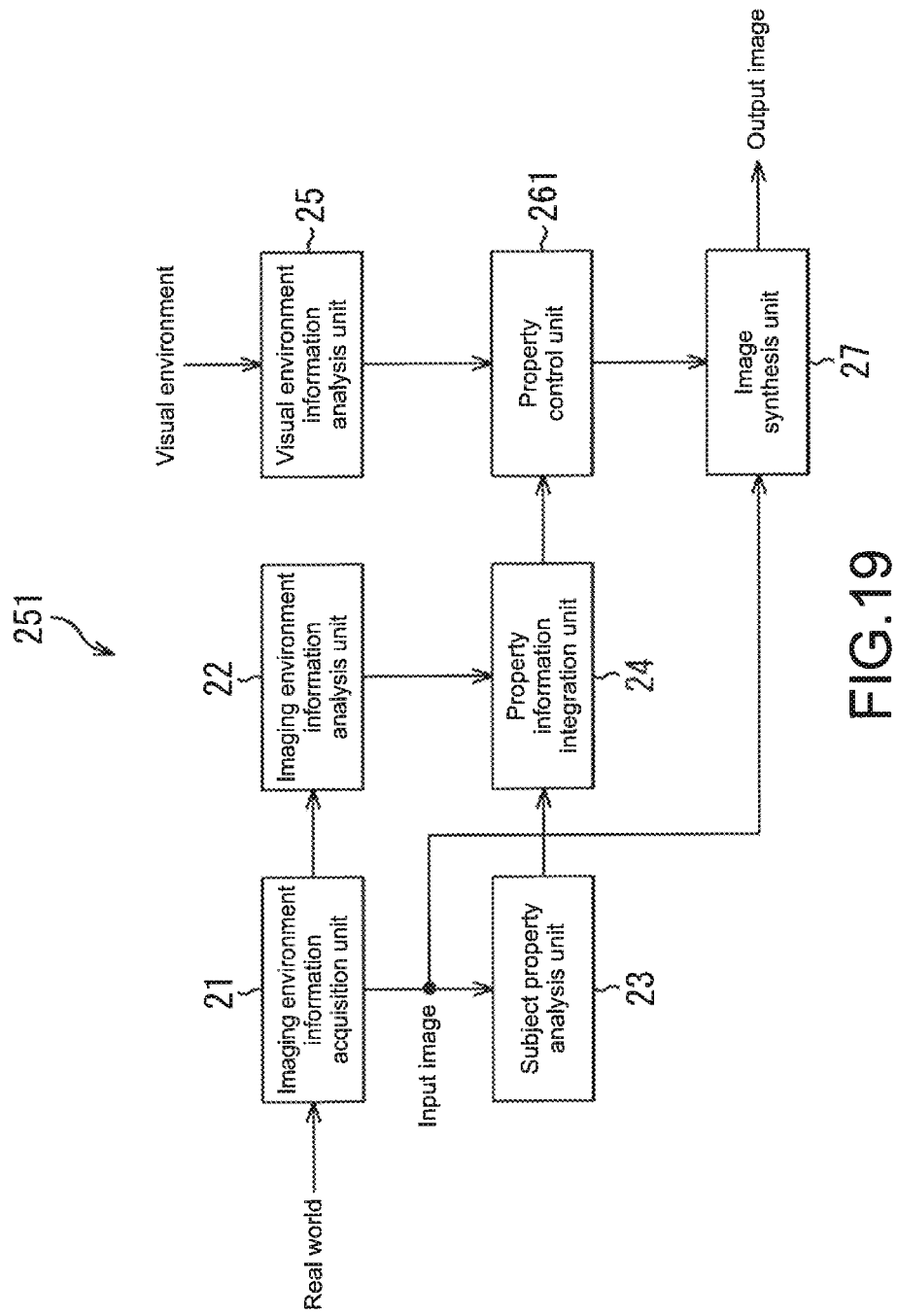
FIG. 19 is a block diagram showing a configuration example of an image processing apparatus according to a fifth embodiment.

FIG. 19 is a diagram showing a configuration of an image processing apparatus according to a fifth embodiment of the present disclosure. The example of FIG. 19 shows a configuration of an image processing apparatus that integrates a physical property parameter estimated based on an image and a physical property parameter acquired at the time of imaging and then uses the resultant parameter for the texture control.

An image processing apparatus 251 shown in FIG. 19 has a configuration in common with the image processing apparatus 11 shown in FIG. 3 in that the imaging environment information acquisition unit 21, the imaging environment information analysis unit 22, the subject property analysis unit 23, the visual environment information analysis unit 25, the property information integration unit 24, and the image synthesis unit 27 are provided.

The image processing apparatus 251 is different from the image processing apparatus 11 shown in FIG. 3 in that the property control unit 26 is replaced with a property control unit 261.

In other words, the imaging environment information analysis unit 22 supplies the analyzed imaging information to the property information integration unit 24. The subject property analysis unit 23 supplies the analyzed property of the subject (image estimation information) to the property information integration unit 24.

The property information integration unit 24 integrates the imaging information supplied from the imaging environment information analysis unit 22 and the image estimation information supplied from the subject property analysis unit 23, based on the degree of reliability, and supplies the resultant information to the property control, unit 261 as a physical property parameter on the subject.

The property control unit 261 determines processing details for controlling the texture based on the physical property parameter supplied from the property information integration unit 24. Specifically, the property control unit 261 determines processing details for the texture control to take into consideration the specular reflection component and the whole balance to adjust the diffuse reflection component as well based on, for example, the reflection property of the subject as a physical property parameter. The property control unit 261 causes the image synthesis unit 27 to perform the determined texture control.

The property control unit 261 causes the image synthesis unit 27 to perform the texture control in accordance with the visual environment parameter supplied from the visual environment information analysis unit 25, to optimize the texture control. Specifically, the property control unit 261 determines processing details for the texture control to adjust a contrast in accordance with, for example, the illumination light (visual environment light) at the time of viewing as a visual environment parameter, and causes the image synthesis unit 27 to perform the determined texture control.

Figure 20:
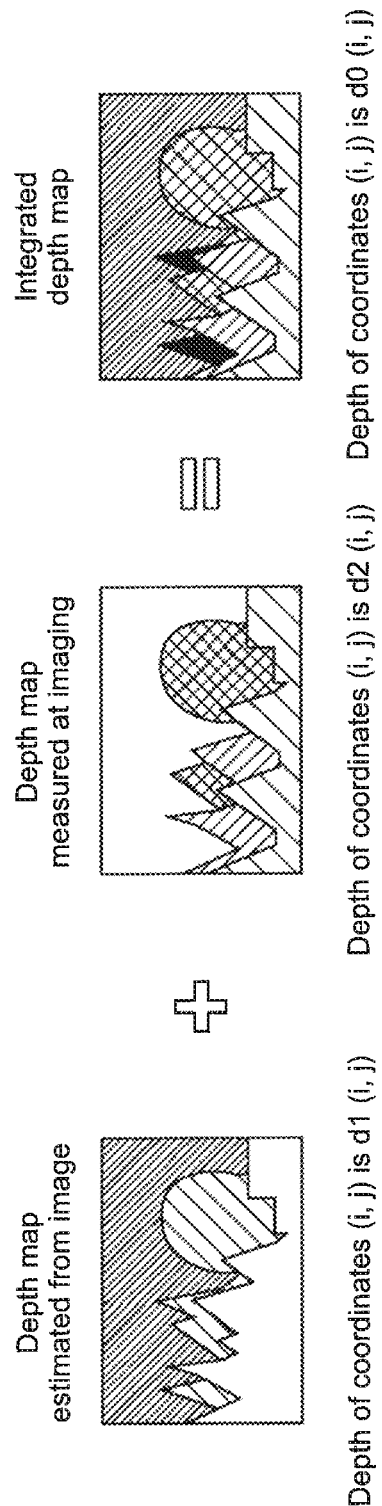
FIG. 20 is a diagram showing an example of an integration method.

FIG. 20 is a diagram showing an example of an integration method by the property information integration unit 24. For example, as shown in FIG. 20, the property information integration unit 24 integrates the imaging information supplied from the imaging environment information analysis unit 22 and the image estimation information supplied from the subject property analysis unit 23.

For example, a depth d1 (i,j) of coordinates (i,j) in a depth map estimated from the image and a depth d2 (i,j) of coordinates (i,j) in a depth map measured at the time of imaging are added, and thus a depth d0 (i,j) of coordinates (i,j) in the integrated depth map is calculated.

Here, a spatial variance value V {d1 (i,j)} of the d1 (i,j) is represented by the following expression (1).

$$V\{d1(i, j)\} = \frac{1}{n} \sum_{\substack{-1 \le s \le 1 \\ -1 \le t \le 1}} \left\{ d1(i+s, i+t) - \frac{1}{n} \sum_{\substack{-1 \le u \le 1 \\ -1 \le v \le 1}} d1(i+u, j+v) \right\}^2 \quad (1)$$

For example, as the variance value becomes high, the results of the estimation are considered to be more unstable. As shown in the following expression (2), the information of d1 and d2 are added in accordance with the variance value that can be considered to have a low degree of reliability on the depth information. Thus, depth information d0 as a final result can be obtained.

$$d0(i, j) = \frac{V\{d2(i, j)\}}{V\{d1(i, j)\} + V\{d2(i, j)\}} \cdot d1(i, j) + \frac{V\{d1(i, j)\}}{V\{d1(i, j)\} + V\{d2(i, j)\}} \cdot d2(i, j) \quad (2)$$

It should be noted that the integration method of FIG. 20 is merely one example, and the integration may be performed by another integration method. Further, the depth information has been described as an example in the example of FIG. 20, but other property information can also be integrated similarly.

(Example of Image Processing)

Figure 21:
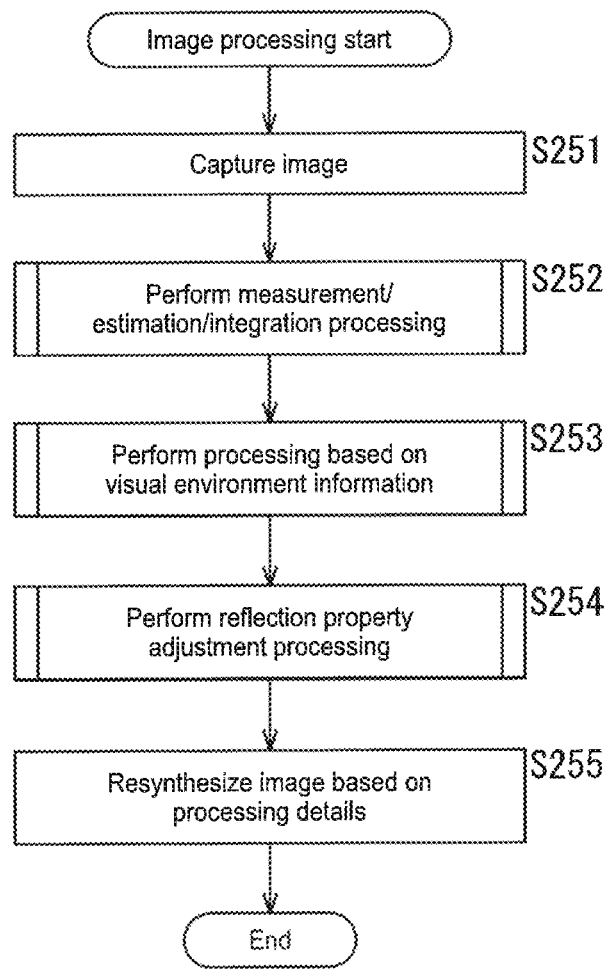
FIG. 21 is a flowchart for describing image processing of the image processing apparatus of FIG. 19.

Next, the image processing of the image processing apparatus 251 of FIG. 19 will be described with reference to the flowchart of FIG. 21.

In Step S251, the imaging environment information acquisition unit 21 captures an image of the subject and inputs the image of the subject. The imaging environment information acquisition unit 21 supplies the input image to the subject property analysis unit 23 and the image synthesis unit 27.

In Step S252, the imaging environment information acquisition unit 21, the imaging environment information analysis unit 22, the subject property analysis unit 23, and the property information integration unit 24 perform measurement/estimation/integration processing. The measurement/estimation/integration processing will be described later with reference to FIG. 22. Through the processing in Step S252, the measured imaging information and the estimated image estimation information are integrated, and the resultant information is supplied to the property control unit 261 as physical property parameters (such as the reflection property of the subject, the imaging environment light, and the form of the subject).

In Step S253, the visual environment, information analysis unit 25 and the property control unit 261 perform processing based on visual environment information that indicates an environment in which images are viewed. The processing based on the visual environment information is basically the same processing as that described above with reference to FIG. 12 and thus its description will be omitted to avoid the repetition. Through the processing in Step S253, processing details for the texture control based on the visual environment information are determined.

In Step S254, the property control unit 261 performs reflection property adjustment processing for the subject. The reflection property adjustment processing is basically the same processing as that described above with reference to FIG. 8 and thus its description will be omitted to avoid the repetition. In this case, the physical property parameter (reflection property) integrated by the property information integration unit 24 is referred to. Through the processing in Step S254, processing details for the texture control used on the reflection property are determined.

In Step S255, the image synthesis unit 27 resynthesizes the input, image based on the determined processing details for the texture control. In other words, in the example of FIG. 21, the contrast of the visual environment light is adjusted and the reflection property of the image is adjusted by the integrated physical property parameters. Thus, the texture of the image of the subject is controlled.

Figure 22:
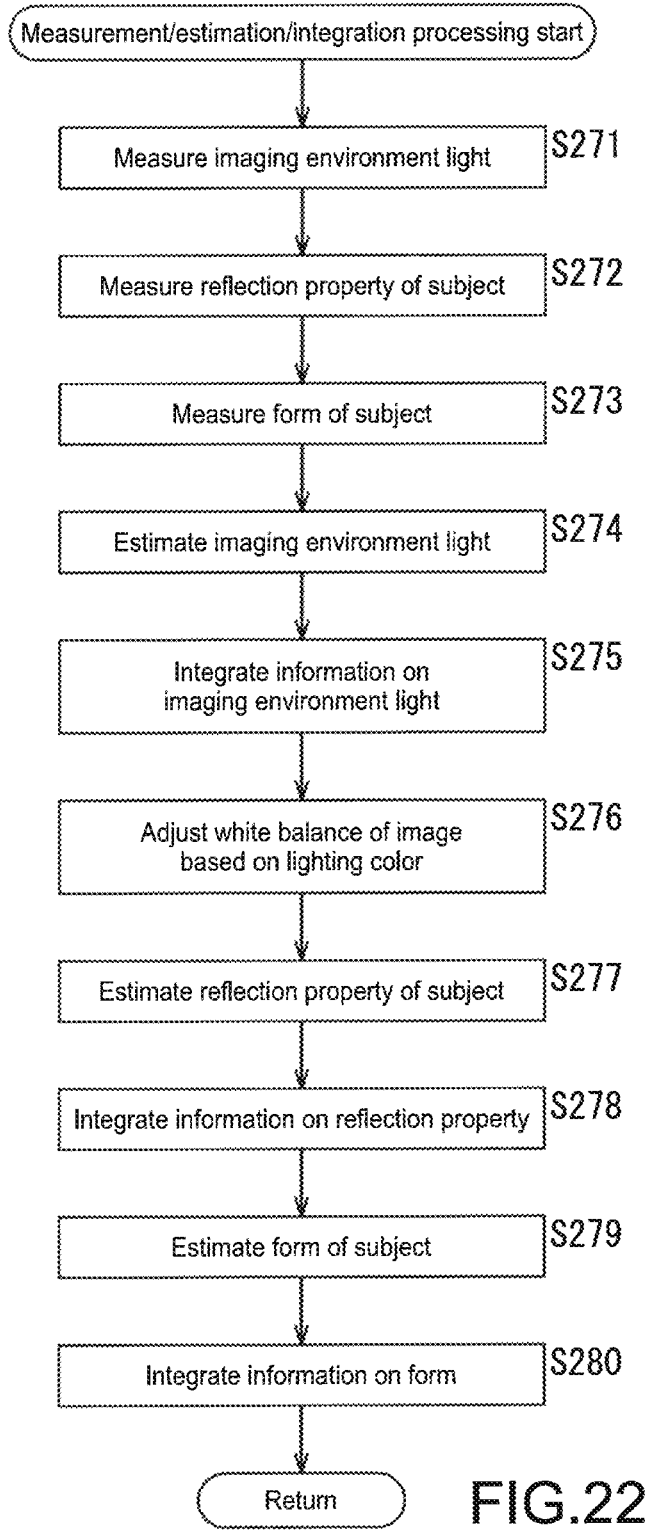
FIG. 22 is a flowchart for describing measurement/estimation/integration processing.

Next, the measurement/estimation/integration processing in Step S252 of FIG. 21 will be described with reference to the flowchart of FIG. 22.

In Step S271, the imaging environment information acquisition unit 21 measures imaging environment light and supplies the measured imaging environment light to the imaging environment information analysis unit 22. The imaging environment information analysis unit 22 analyzes the imaging environment light supplied from the imaging environment information acquisition unit 21 and as a result of the analysis, supplies information on the imaging environment light to the property information integration unit 24.

In Step S272, the imaging environment information acquisition unit 21 measures the reflection property of the subject and supplies the measured reflection property of the subject to the imaging environment information analysis unit 22. The imaging environment information analysis unit 22 analyzes the reflection property of the subject, which has been supplied from the imaging environment information acquisition unit 21, and supplies the analyzed reflection property of the subject to the property information integration unit 24.

In Step S273, the imaging environment information acquisition unit 21 measures the form of the subject and supplies the measured form of the subject to the imaging environment information analysis unit 22. The imaging environment information analysis unit 22 analyzes the form of the subject, which has been supplied from the imaging environment information acquisition unit 21, and supplies the analyzed form of the subject to the property information integration unit 24.

In Step S274, the subject property analysis unit 23 estimates and analyzes imaging environment light based on the supplied input image and as a result of the analysis, acquires information on the imaging environment light. The subject property analysis unit 23 supplies the information on the imaging environment light to the property information integration unit 24.

In Step S275, the property information integration unit 24 integrates the information on the measured imaging environment light and the information on the estimated imaging environment light by the method described above with reference to FIG. 2C, for example. The property information integration unit 24 supplies the integrated information on the imaging environment light to the property control unit 261 as a physical property parameter.

In Step S276, the property control unit 261 causes the image synthesis unit 27 to adjust white balance of the image, based on a lighting color acquired from the information on the imaging environment light. It should be noted that the adjustment processing above may be performed at the timing of the reflection property adjustment processing in Step S234 of FIG. 21 described above, but it is desirable to perform the white balance adjustment prior to other adjustments, and thus such processing order is adopted.

In Step S277, the subject property analysis unit 23 estimates and analyzes the reflection property of the subject and supplies information on the analyzed reflection property to the property information integration unit 24.

In Step S278, the property information integration unit 24 integrates the information on the measured reflection property of the subject and the information on the estimated reflection property of the subject by the method described above with reference to FIG. 20, for example. The property information integration unit 24 supplies the integrated information, on the reflection property of the subject to the property control unit 261 as a physical property parameter.

In Step S279, the subject property analysis unit 23 estimates and analyzes the form of the subject and supplies information on the analyzed form of the subject to the property information integration unit 24.

In Step S280, the property information integration unit 24 integrates the information on the measured form of the subject and the information on the estimated form of the subject by the method described above with reference to FIG. 20, for example. The property information integration unit 24 supplies the integrated information on the form of the subject to the property control unit 261 as a physical property parameter.

In such a manner, the illumination light, the reflection property and the form of the subject, and the like, which are property of the subject, are measured at the time of imaging. Further, the illumination light, the reflection property and the form of the subject, and the like, which are property of the subject, are estimated based on the input image. Those pieces of information are integrated based on reliability. This allows the optimization of the illumination light, the improvement of the luster, and the reproduction of the transparency in the image.

7. Sixth Embodiment (Configuration Example of Image Processing Apparatus)

Figure 23:
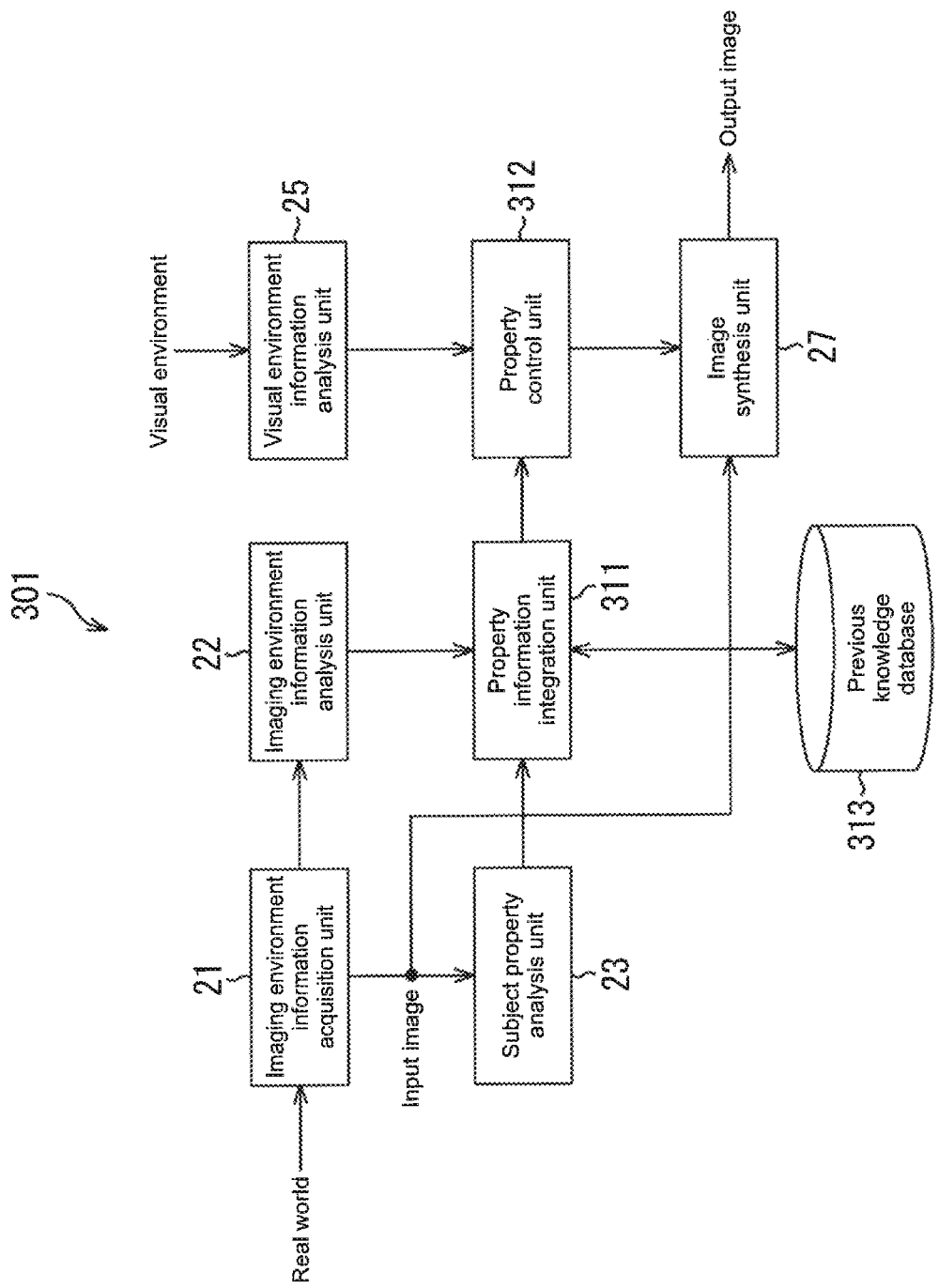
FIG. 23 is a block diagram showing a configuration example of an image processing apparatus according to a sixth embodiment.

FIG. 23 is a diagram showing a configuration of an image processing apparatus according to a sixth embodiment of the present disclosure. The example of FIG. 23 shows a configuration of an image processing apparatus that also acquires material information of the subject as property of the subject and uses the acquired material information for the texture control. Further, in the example of FIG. 23, as texture control, texture restoration is also performed. In this example, the fact that different materials each have inherent reflection property is used.

An image processing apparatus 301 shown in FIG. 23 has a configuration in common with the image processing apparatus 11 shown in FIG. 3 in that the imaging environment information acquisition unit 21, the imaging environment information analysis unit 22, the subject property analysis unit 23, the visual environment information analysis unit 25, and the image synthesis unit 27 are provided.

The image processing apparatus 301 is different from the image processing apparatus 11 shown in FIG. 3 in that the property information integration unit 24 is replaced with a property information integration unit 311, the property control unit 26 is replaced with a property control unit 312, and a previous knowledge database 313 is additionally provided.

In other words, the imaging environment information analysis unit 22 supplies the analyzed imaging information (including the material information of the subject) to the property information integration unit 311. The subject property analysis unit 23 supplies the analyzed property of the subject (image estimation information) to the property information integration unit 311.

The property information integration unit 311 integrates the imaging information supplied from the imaging environment information analysis unit 22 and the image estimation information supplied from the subject property analysis unit 23, based on the degree of reliability, and supplies the result of the integration to the property control unit 312 as a physical property parameter on the subject. Further, under the control of the property control unit 312, the property information integration unit 311 reads out a texture image corresponding to the material (skin, metal, cloth, etc.) of the subject from the previous knowledge database 313 and supplies the read texture image to the property control unit 312.

The property control unit 312 determines processing details for controlling the texture based on the physical property parameter supplied from the property information integration unit 311. Specifically, the property control unit 312 determines processing details for the texture control to take into consideration the specular reflection component and the whole balance to adjust the diffuse reflection component as well used on, for example, the reflection property of the subject as a physical property parameter. The property control unit 312 causes the image synthesis unit 27 to perform the determined texture control.

The property control unit 312 causes the image synthesis unit 27 to perform the texture control in accordance with the visual, environment parameter supplied from the visual environment information analysis unit 25, to optimize the texture control. Specifically, the property control unit 312 determines processing details for the texture control to adjust a contrast in accordance with, for example, the illumination light (visual environment light) at the time of viewing as a visual environment parameter, and causes the image synthesis unit 27 to perform the determined texture control.

Further, the property control unit 312 determines processing details for the texture control to cause the property information integration unit 311 to read out a texture image corresponding to the material and to perform texture restoration processing corresponding to the material of the input image based on the read texture image.

The previous knowledge database 313 stores the texture image corresponding to the material of the subject.

As described above, in the image processing apparatus 301, the illumination light, the reflection property, the form, and the material of the subject, and the like, which are property of the subject, are measured at the time of imagine. Further, the illumination light, the reflection property, the form, and the material of the subject, and the like, which are property of the subject, are estimated based on the input image. Those pieces of information are integrated to be used for the texture control.

(Example of Image Processing)

Figure 24:
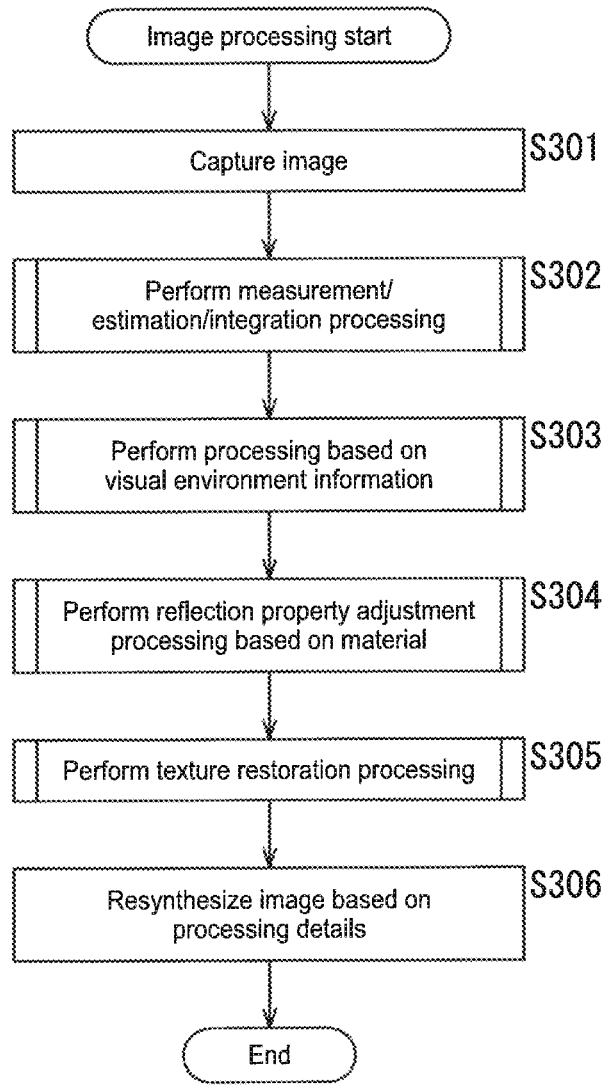
FIG. 24 is a flowchart for describing image processing of the image processing apparatus of FIG. 23.

Next, the image processing of the image processing apparatus 301 of FIG. 23 will be described with reference to the flowchart of FIG. 24.

In Step S301, the imaging environment information acquisition unit 21 captures an image of the subject and inputs the image of the subject. The imaging environment information acquisition unit 21 supplies the input image to the subject property analysis unit 23 and the image synthesis unit 27.

In Step S302, the imaging environment information acquisition unit 21, the imaging environment information analysis unit 22, and the subject property analysis unit 23 perform measurement/estimation/integration processing. The measurement/estimation/integration processing will be described later with reference to FIG. 25. Through the processing in Step S302, the measured physical property parameter and the estimated physical property parameter (including the reflection property of the subject, the imaging environment light, the form of the subject, the material of the subject, and the like) are supplied to the property control unit 312.

In Step S303, the visual environment information analysis unit 25 and the property control unit 312 perform processing based on visual environment information that indicates an environment in which images are viewed. The processing based on the visual environment information is basically the same processing as that described above with reference to FIG. 12 and this its description will be omitted to avoid the repetition. Through the processing in Step S303, processing details for the texture control based on the visual environment information are determined.

In Step S304, the property control unit 312 performs reflection property adjustment processing based on the material of the subject. The reflection property adjustment processing will be described later with reference to FIG. 26. In this case, the physical property parameter (including the material and the reflection property) integrated by the property information integration unit 311 is referred to. Through the processing in Step S304, processing details for the texture control based on the reflection property are determined.

In Step S305, the property control unit 312 causes the property information integration unit 311 to read out a texture image corresponding to the material and uses the texture image to perform texture restoration processing corresponding to the type of material of the input image. The texture restoration processing will be described later with reference to FIG. 27. Through the processing in Step S305, processing details for the texture control by texture restoration are determined.

In Step S306, the image synthesis unit 27 resynthesizes the input image based on the determined processing details for the texture control. In other words, in the example of FIG. 24, the contrast of the measured visual environment light is adjusted, the reflection property is adjusted based on the material of the image, and the texture restoration corresponding to the material is performed. Thus, the texture of the image of the subject is controlled.

Figure 25:
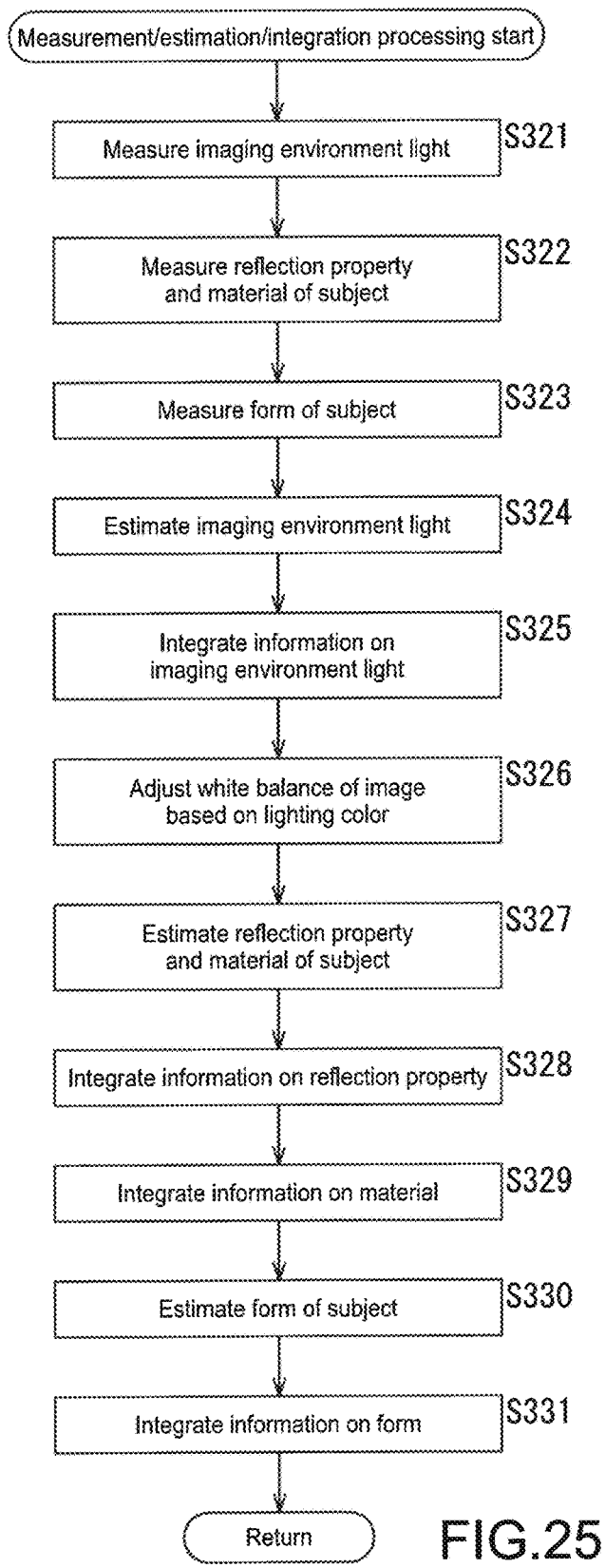
FIG. 25 is a flowchart for describing measurement/estimation/integration processing.

Next, the measurement/estimation/integration processing in Step S302 of FIG. 24 will be described with reference to the flowchart of FIG. 25.

In Step S321, the imaging environment information acquisition unit 21 measures imaging environment light and supplies the measured imaging environment light to the imaging environment information analysis unit 22. The imaging environment information analysis unit 22 analyzes the imaging environment light supplied, from the imaging environment information acquisition unit 21 and as a result of the analysis, supplies information on the imaging environment light to the property information integration unit 311.

In Step S322, the imaging environment information acquisition unit 21 measures the reflection property of the subject and supplies the measured reflection property of the subject and the material of the subject to the imaging environment information analysis unit 22. The imaging environment information analysis unit 22 analyzes the reflection property of the subject and the material of the subject, which have been supplied from the imaging environment information acquisition unit 21, and supplies the analyzed reflection property and material of the subject to the property information integration unit 311.

In Step S323, the imaging environment information acquisition unit 21 measures the form of the subject and supplies the measured form of the subject to the imaging environment information analysis unit 22. The imaging environment information analysis unit 22 analyzes the form of the subject, which has been supplied from the imaging environment information acquisition unit 21, and supplies the analyzed form of the subject to the property information integration unit 311.

In Step S324, the subject property analysis unit 23 estimates and analyzes imaging environment light based on the supplied input image and as a result of the analysis, acquires information on the imaging environment light. The subject property analysis unit 23 supplies the information on the imaging environment light to the property information integration unit 311.

In Step S325, the property information integration unit 311 integrates the information on the measured imaging environment light and the information on the estimated imaging environment light by the method described above with reference to FIG. 20, for example. The property information integration unit 311 supplies the integrated information on the imaging environment light to the property control unit 312 as a physical property parameter.

In Step S326, the property control unit 312 causes the image synthesis unit 27 to adjust white balance of the image, based on a lighting color acquired from the Information on the imaging environment, light. It should be noted that the adjustment processing above may be performed at the timing of the reflection property adjustment processing in Step S304 of FIG. 24 described above, but it is desirable to perform the white balance adjustment prior to other adjustments, and thus such processing order is adopted.

In Step S327, the subject property analysis unit 23 estimates and analyzes the reflection property and the material of the subject and supplies information on the analyzed reflection property and material to the property information integration unit 311.

In Step S328, the property information integration unit 311 integrates the information on the measured reflection property of the subject and the information on the estimated reflection property of the subject by the method described above with reference to FIG. 20, for example. The property information integration unit 311 supplies the integrated information on the reflection property of the subject to the property control unit 312 as a physical property parameter.

In Step S329, the property information integration unit 311 integrates the information on the measured material of the subject and the information on the estimated material of the subject by the method described above with reference to FIG. 20, for example. The property information integration unit 311 supplies the integrated information on the material of the subject to the property control unit 312 as a physical property parameter.

In Step S330, the subject property analysis unit 23 estimates and analyzes the form of the subject and supplies information on the analyzed form of the subject to the property information integration unit 311.

In Step S331, the property information integration unit 311 integrates the information on the measured form of the subject and the information on the estimated form of the subject by the method described above with reference to FIG. 20, for example. The property information integration unit 311 supplies the integrated information on the form of the subject to the property control unit 312 as a physical property parameter.

In such a manner, in addition to the illumination light and the reflection property and form of the subject, which are property of the subject, the material of the subject and the like are further measured at the time of imaging. Further, those pieces of information are estimated based on the input image and integrated based on reliability. The physical property parameters thus integrated are used for the texture control. This allows the optimization of the illumination light, the improvement of the luster, and the reproduction of the transparency in the image.

Figure 26:
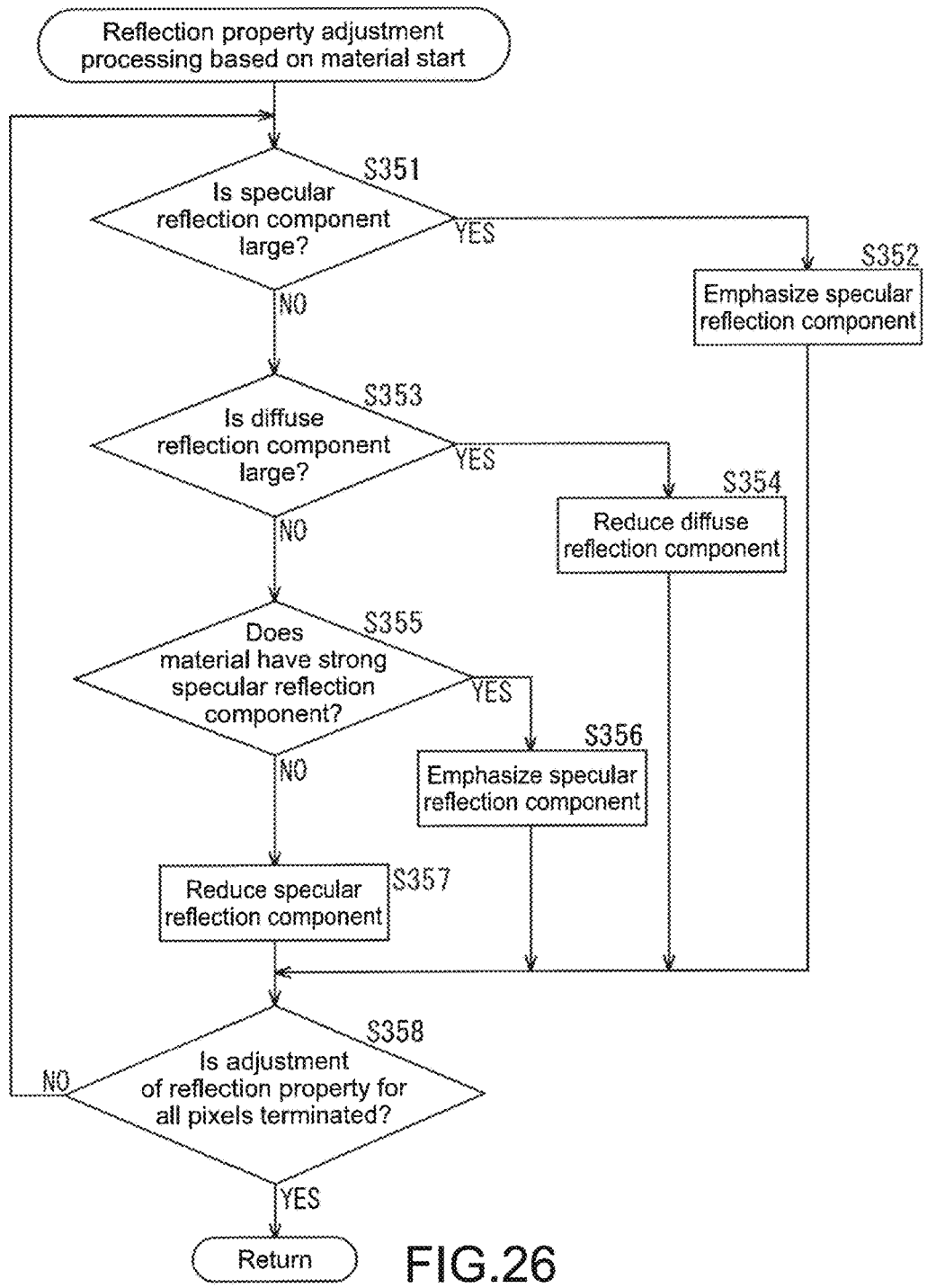
FIG. 26 is a flowchart for describing reflection property adjustment processing based on a material.

Next, the reflection property adjustment processing based on the material in Step S304 of FIG. 24 will be described with reference to the flowchart of FIG. 26.

In Step S351, the property control unit 312 determines whether the specular reflection component is large or not based on the information on the reflection property of the subject, which has been supplied from the property information integration unit 311. In Step S351, when it is determined that the specular reflection component is large, the processing proceeds to Step S352.

In Step S352, as texture control, the property control unit 312 determines to emphasize the specular reflection component. In Step S351, when it is determined that the specular reflection component is small, the processing proceeds to Step S353.

In Step S353, the property control unit 312 determines whether the diffuse reflection component is large or not. In Step S353, when it is determined that the diffuse reflection component is large, the processing proceeds to Step S354. In Step S354, as texture control, the property control unit 312 determines to reduce the diffuse reflection component.

In Step S353, when it is determined that the diffuse reflection component is small, the processing proceeds to Step S355.

In Step S355, the property control unit 312 determines whether the material has a strong specular reflection component or not based on the information on the material of the subject, which is integrated by the property information integration unit 311. In Step S355, when it is determined that the material has a strong specular reflection component, the processing proceeds to Step S356. In Step S356, as texture control, the property control unit 312 determines to emphasize the specular reflection component.

In Step S355, when it is determined that the material does not have a strong specular reflection component, the processing proceeds to Step S357. In Step S357, as texture control, the property control unit 312 determines to reduce the specular reflection component.

In Step S358, the property control unit 312 determines whether the adjustment of the reflection property for all the pixels is terminated or not.

In Step S358, when it is determined that the adjustment of the reflection property for all the pixels is terminated, the reflection property adjustment processing is terminated. In Step S358, when it is determined that the adjustment of the reflection property for all the pixels is not yet terminated, the processing returns to Step S351 and processing in Step S351 and subsequent processing are repeated.

As described above, the reflection property of the image is adjusted in accordance with the material of the subject, and the texture of the image of the subject is controlled. This allows the optimization of the illumination light, the improvement of the luster, and the reproduction of the transparency in the image.

Next, the texture restoration processing in Step S305 of FIG. 24 will be described with reference to the flowchart of FIG. 27.

In Step S371, the property control unit 312 controls the property information integration unit 311 to acquire a texture image (patch data) corresponding to the material of the subject from the previous knowledge database 313.

Figure 28:
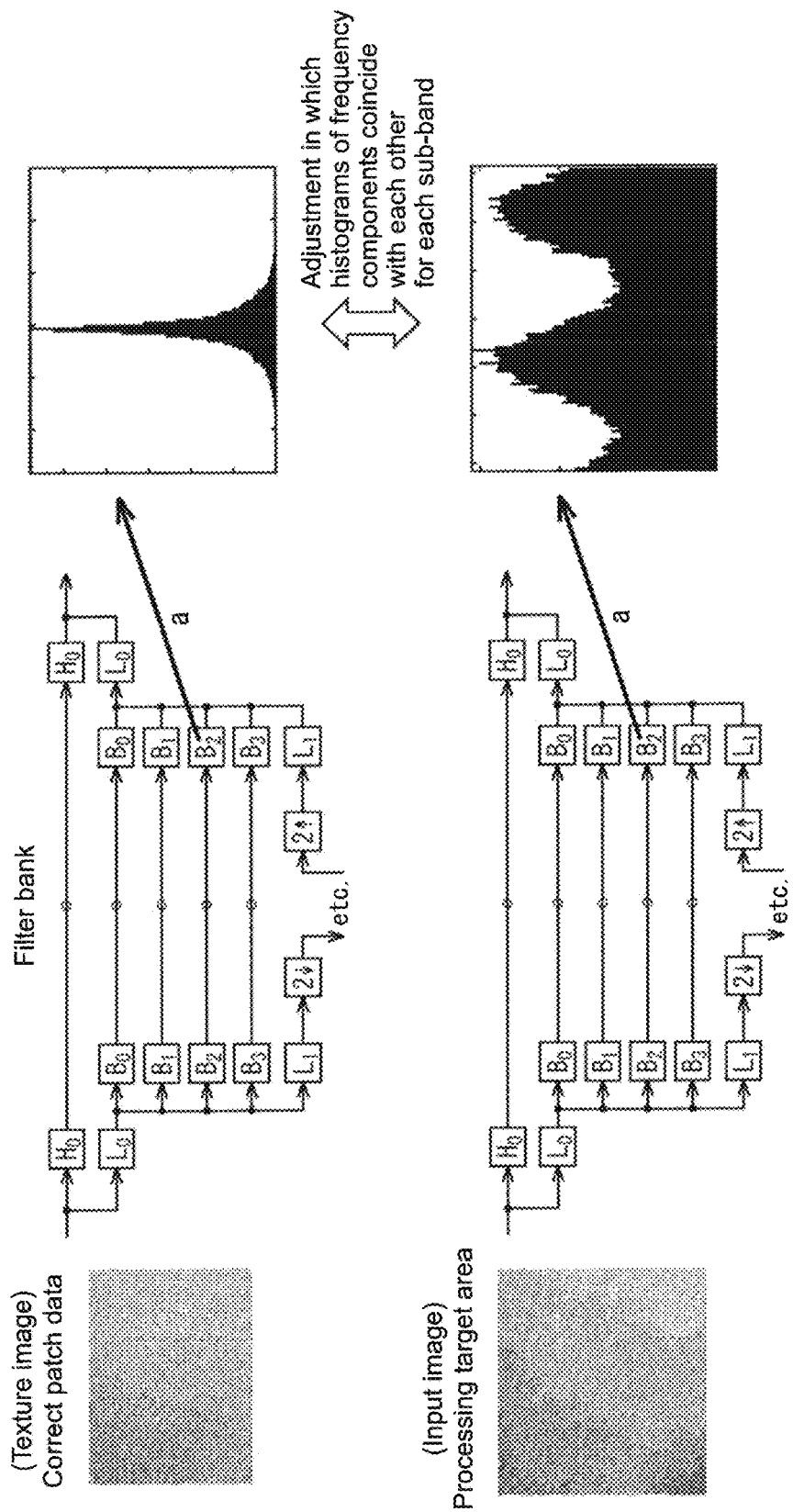
FIG. 28 is a diagram showing an example of a method of adjusting a feature amount of a frequency range.

In Step S372, the property control unit 312 controls the image synthesis unit 27 to divide each of the input image and the texture image into sub-bands by using a filter bank as shown in FIG. 28.

In Step S373, the property control unit 312 controls the image synthesis suit 27 to perform such an adjustment that a histogram of each frequency component of the input image coincides with a histogram of each frequency component of the texture image for each sub-band. In other words, the property control unit 312 controls the image synthesis unit 27 to perform histogram equalization on the input image and the texture image for each sub-band.

As described above, the texture control to restore the texture is performed, so that the texture of the subject is improved. This can provide a more realistic image.

Figure 27:
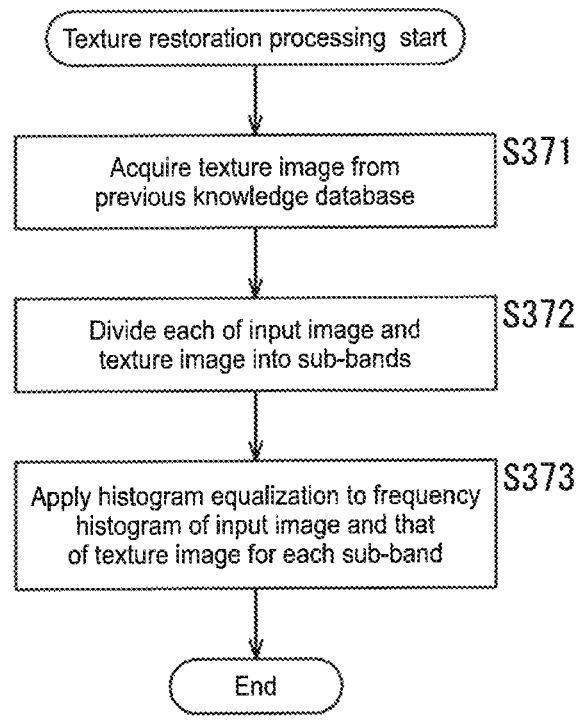
FIG. 27 is a flowchart for describing texture restoration processing.
Figure 29:
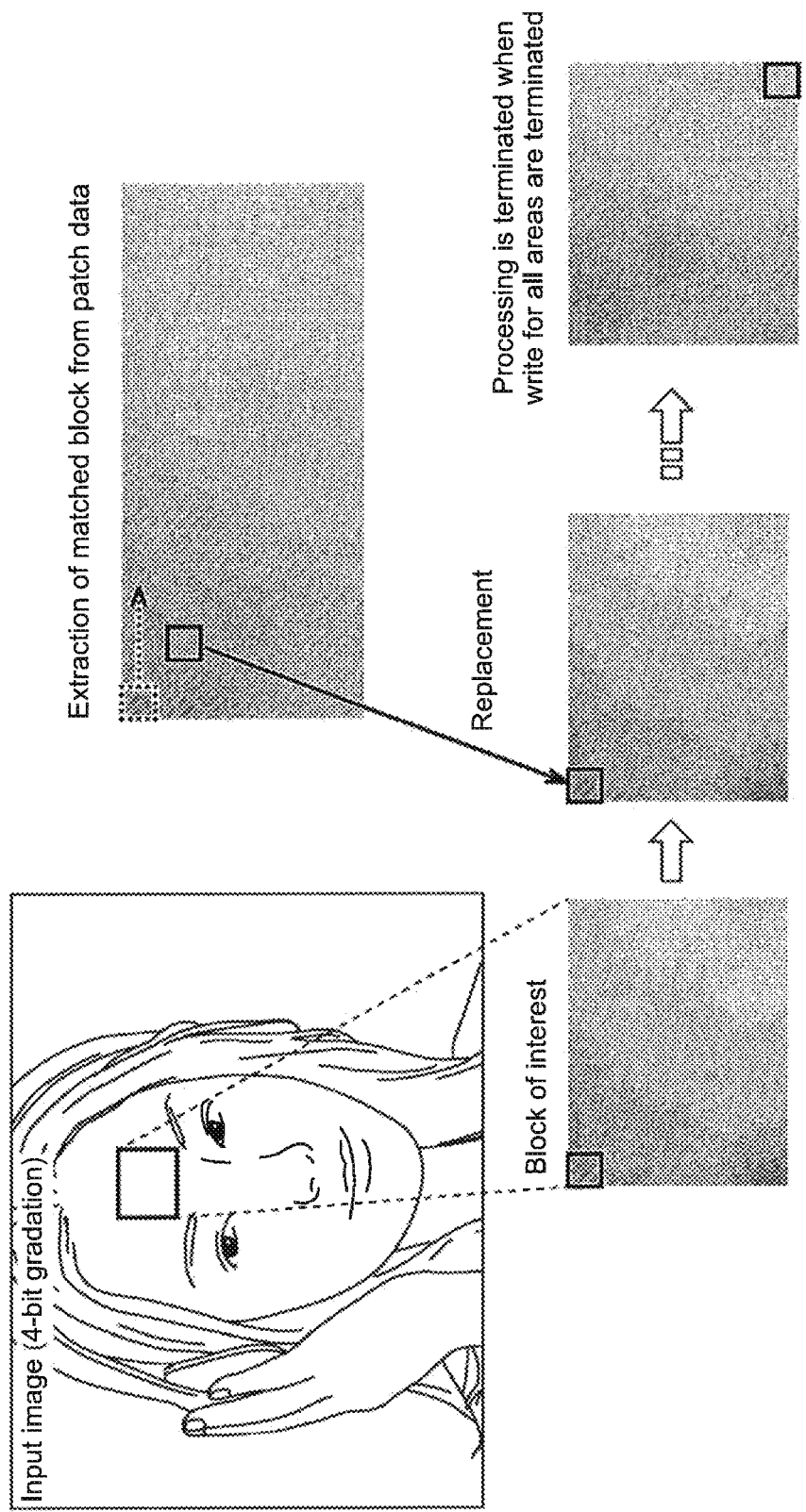
FIG. 29 is a diagram showing a restoration example of the texture by block matching.

In the examples of the FIGS. 27 and 28, the texture restoration processing is performed by the histogram equalization, which is an example of a method of adjusting a feature amount of a frequency range. It should be noted that the texture restoration processing is not limited to such examples. For example, as shown in FIG. 29, the replacement of pixel values by block matching also allows the restoration of the texture.

For example, a block is extracted from a texture image (patch data) corresponding to the input image. The extracted block matches a pixel value of a block of interest in a processing target area of the input image. Then, the block of interest is replaced with the extracted block. When such processing is performed for all the areas and write for all the areas are terminated, the processing is terminated.

8. Seventh Embodiment (Configuration Example of Image Processing Apparatus)

Figure 30:
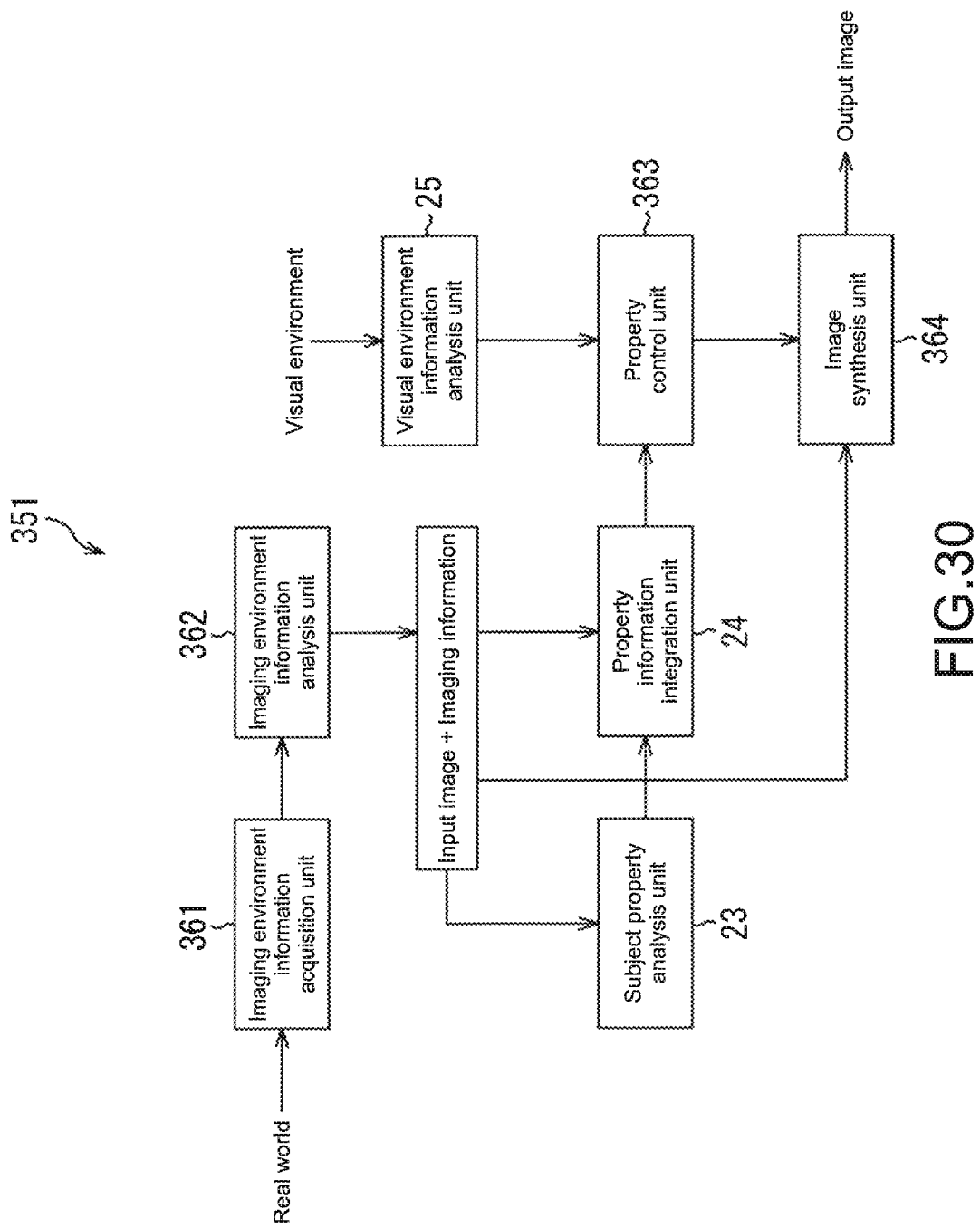
FIG. 30 is a block diagram showing a configuration example of an image processing apparatus according to a seventh embodiment.

FIG. 30 is a diagram showing a configuration of an image processing apparatus according to a seventh embodiment of the present disclosure. The example of FIG. 30 shows a configuration of an image processing apparatus that integrates information acquired at the time of imaging and information estimated based on an image, changes the integrated information into metadata, and uses the metadata for the texture control in a subsequent stage (image synthesis unit).

An image processing apparatus 351 shown in FIG. 30 has a configuration in common with the image processing apparatus 11 shown in FIG. 3 in that the subject property analysis unit 23, the property information integration unit 24, and the visual environment information analysis unit 25 are provided.

The image processing apparatus 351 is different from the image processing apparatus 11 shown in FIG. 3 in that the imaging environment information acquisition unit 21, the imaging environment information analysis unit 22, the property control unit 26, and the image synthesis unit 27 are replaced with an imaging environment information acquisition unit 361, an imaging environment information analysis unit 362, a property control unit 363, and an image synthesis unit 364, respectively.

In other words, the imaging environment information acquisition unit 361 captures an image of a subject and inputs the image of the subject. Further, the imaging environment information acquisition unit 361 acquires imaging information on an environment and the subject at the time of imaging of the subject and supplies the input image and the imaging information to the imaging environment information analysis unit 362.

The imaging environment information analysis unit 362 supplies the input image to the subject property analysis unit 23 and supplies the imaging information to the property information integration unit 24. Further, the imaging environment information analysis unit 362 changes the imaging information into metadata to add the metadata to the input image and supplies the input image and the imaging information changed into metadata to the image synthesis unit 364.

The image synthesis unit 364 resynthesizes the input image based on processing details determined by the property control unit 363. It should be noted that if camera parameters such as a shutter speed, an aperture, and a level of brightness of a lens are obtained as metadata, information on the brightness of the input image (absolute luminance) can be roughly grasped. Consequently, the image synthesis unit 364 further performs recalculation based on the metadata added to the input image to resynthesize the input image.

(Example of Image Processing)

Figure 31:
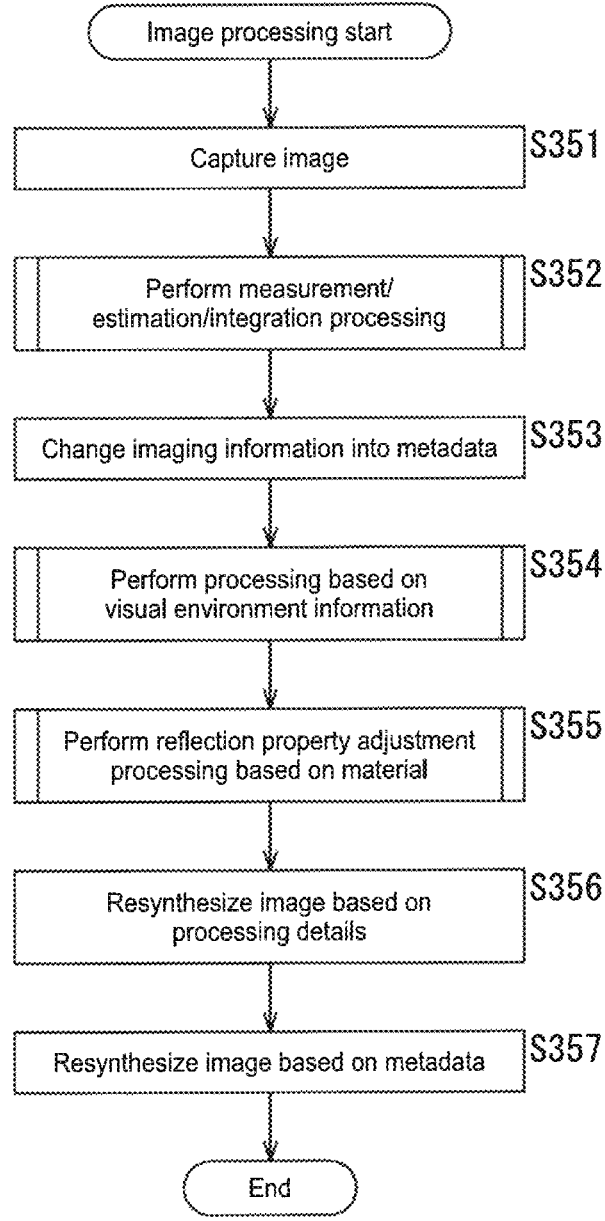
FIG. 31 is a flowchart, for describing image processing of the image processing apparatus of FIG. 30.

Next, the image processing of the image processing apparatus 351 of FIG. 30 will be described with reference to the flowchart of FIG. 31.

In Step S351, the imaging environment information acquisition unit 361 captures an image of the subject and inputs the image of the subject. The imaging environment information acquisition unit 361 supplies the input image to the imaging environment information analysis unit 362. It should be noted that the input image is also supplied from the imaging environment information analysis unit 362 to the subject property analysis unit 23.

In Step S352, the imaging environment information acquisition unit 361, the imaging environment information analysis unit 362, the subject property analysis unit 23, and the property information integration unit 24 perform measurement/estimation/integration processing. The measurement/estimation/integration processing is basically the same processing as that described above with reference to FIG. 25 and thus its description will be omitted to avoid the repetition. Through the processing in Step S352, the measured physical property parameter and the estimated physical property parameter (including the reflection property of the subject, the imaging environment light, the form of the subject, the material of the subject, and the like) are supplied to the property control unit 363.

Further, in Step S35, the imaging environment information analysis unit 362 changes the imaging information into metadata, adds the metadata to the input image, and supplies the resultant image to the image synthesis unit 364

In Step S354, the visual environment information analysis unit 25 and the property control unit 363 perform processing based on visual environment information that indicates an environment in which images are viewed. The processing based on the visual environment information is basically the same processing as that described above with, reference to FIG. 12 and thus its description will be omitted to avoid the repetition. Through the processing in Step S354, processing details for the texture control based on the visual environment information are determined.

In Step S355, the property control unit 363 performs reflection property adjustment processing based on the material of the subject. The reflection property adjustment processing is basically the same processing as that described above with reference to FIG. 26 and thus its description will be omitted to avoid the repetition. In this case, the physical property parameter (including the material and the reflection property) integrated by the property information integration unit 24 is referred to. Through the processing in Step S355, processing details for the texture control based on the reflection property are determined.

In Step S356, the image synthesis unit 364 resynthesizes the input image based on the determined processing details for the texture control. In other words, in the example of FIG. 31, the contrast of the visual environment light is adjusted, and the reflection property of the image is adjusted based on the material. Thus, the texture of the image of the subject is controlled.

Further, in Step S357, the image synthesis unit 364 performs recalculation based on the metadata added to the input image to resynthesize the input image. For example, if camera parameters such as a shutter speed and an aperture are obtained as metadata, information on the brightness of the input image can be roughly grasped. Consequently, the texture of the image is further improved, 9. Eighth Embodiment (Configuration Example of Image Processing Apparatus)

Figure 32:
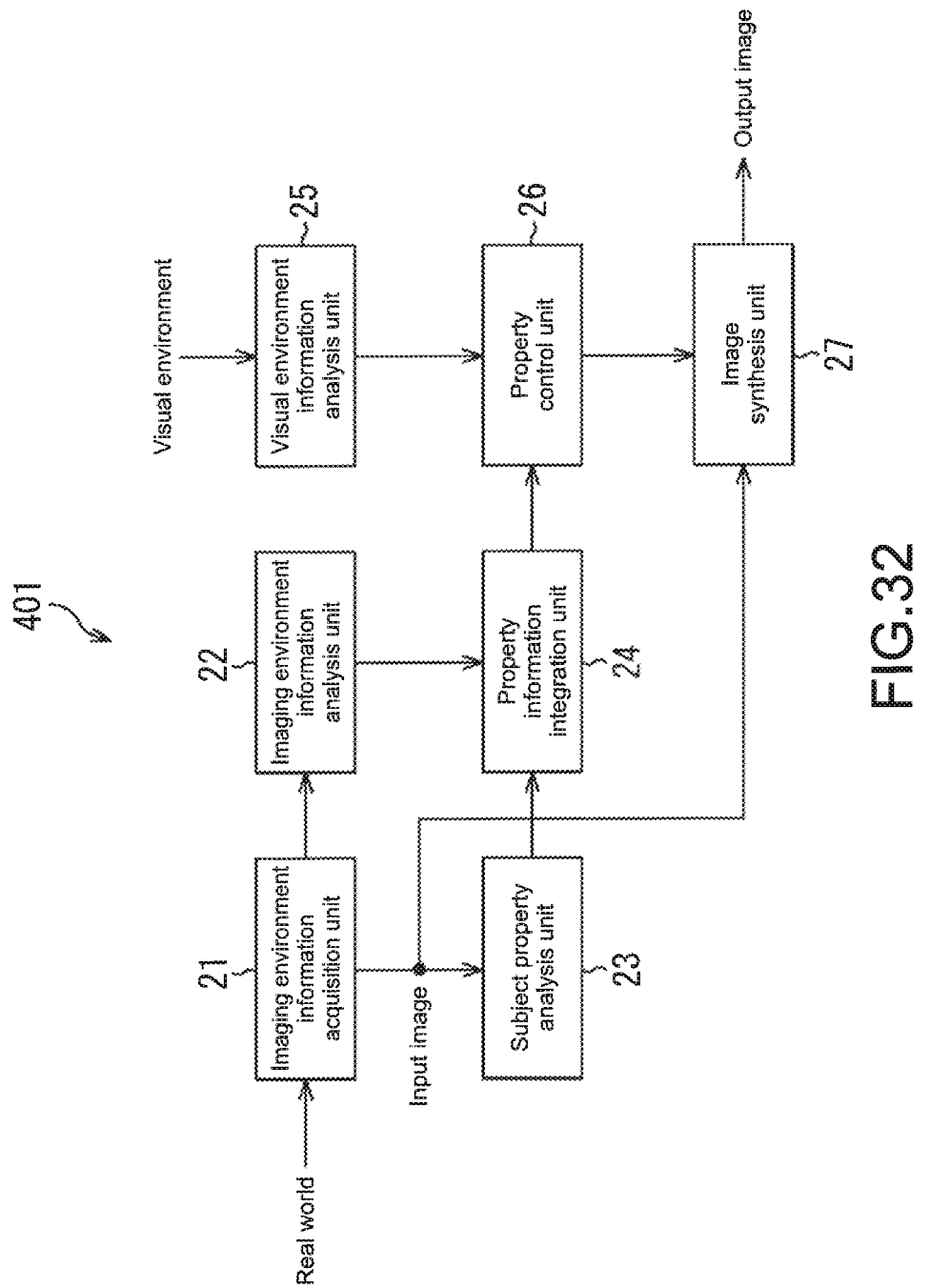
FIG. 32 is a block diagram showing a configuration example of an image processing apparatus according to an eighth embodiment.

FIG. 32 is a diagram showing a configuration of an image processing apparatus according to an eighth embodiment of the present disclosure. The example of FIG. 32 shows a configuration of an image processing apparatus that acquires all information including information acquired at the time of imaging and information estimated based on an image, integrates those pieces of information, and uses the integrated information for the texture control.

An image processing apparatus 401 shown in FIG. 32 basically has the same configuration as the image processing apparatus 11 shown in FIG. 3. In other words, the image processing apparatus 401 includes the imaging environment information acquisition unit 21, the imaging environment information analysis unit 22, the subject property analysis unit 23, the property information integration unit 24, the visual environment information analysis unit 25, the property control unit 20, and the image synthesis unit 27.

It should be noted that in the other examples described above, some physical property parameters such as the reflection property, the lighting, and the material are used. In contrast to this, the example of FIG. 32 shows a configuration in which information acquired at the time of imaging and information estimated based on an image are all acquired and integrated, and those pieces of information are used for the texture control. In the case where all the information are acquired highly accurately in this configuration, any image can be created as if being in the real world by changing the highly accurately acquired information, as in the case where a CG (Computer Graphics) is recreated.

(Example of Image Processing)

Figure 33:
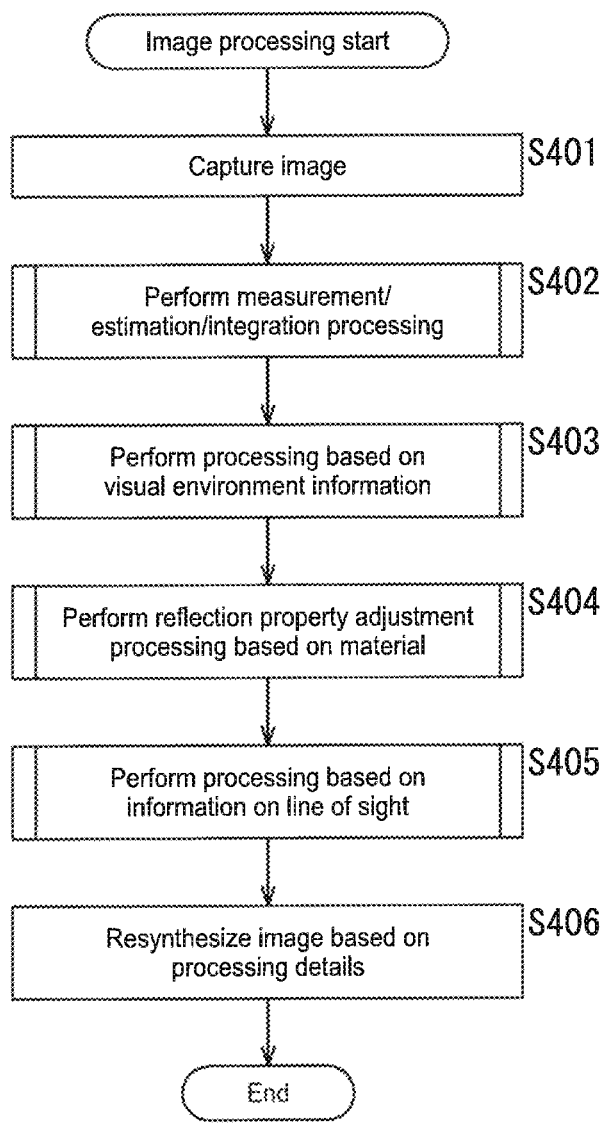
FIG. 33 is a flowchart for describing image processing of the image processing apparatus of FIG. 32.

Next, the image processing of the image processing apparatus 401 of FIG. 32 will be described with reference to the flowchart of FIG. 33.

In Step S401, the imaging environment information acquisition unit 21 captures an image of the subject and inputs the image of the subject. The imaging environment information acquisition unit 21 supplies the input image to the subject property analysis unit 23 and the image synthesis unit 27.

In Step S402, the imaging environment information acquisition unit 21, the imaging environment information analysis unit 22, and the subject property analysis unit 23 perform measurement/estimation/integration processing. The measurement/estimation/integration processing is basically the same processing as that described above with reference to FIG. 25 and thus its description will be omitted to avoid the repetition. Through the processing in Step S402, the measured physical property parameter and the estimated physical property parameter (including the reflection property of the subject, the imaging environment light, the form of the subject, the material of the subject, and the like) are supplied to the property control unit 26.

In Step S403, the visual environment information analysis unit 25 and the property control unit 26 perform processing based on visual environment information that indicates an environment in which images are viewed. The processing based on the visual environment information is basically the same processing as that described above with reference to FIG. 12 and thus its description will be omitted to avoid the repetition. Through the processing in Step S403, processing details for the texture control based on the visual environment information are determined.

In Step S404, the property control unit 26 performs reflection property adjustment processing based on the material of the subject. The reflection property adjustment processing is basically the same processing as that described above with reference to FIG. 26 and thus its description will be omitted to avoid the repetition. In this case, the physical property parameter (including the material and the reflection property) integrated by the property information integration unit 24 is referred to. Through the processing in Step S404, processing details for the texture control, based on the reflection property are determined.

In Step S405, the visual environment information analysis unit 25 and the property control unit 26 perform processing based on information on the line of sight. The processing based on the information on the line of sight is basically the same processing as that described above with reference to FIG. 15 and thus its description will be omitted to avoid the repetition. Through the processing in Step S405, processing details for the texture control based on the information on the line of sight are determined.

In Step S406, the image synthesis unit 27 resynthesizes the input image based on the determined processing details for the texture control. In other words, in the example of FIG. 33, the contrast of the visual environment light is adjusted, the reflection property is adjusted based on the material of the image, and the adjustment based on the information on the line of sight is performed. Thus, the texture of the image of the subject is controlled.

As described above, all the physical property parameters obtained at the time of imaging or based on an image are used. Additionally, when the physical property parameters are acquired highly accurately, the change of those parameters allow the optimization of the illumination light, the improvement of the luster, and the reproduction of the transparency in the image, even if the reproducibility of the input image is poor. In other words, a situation where the subject is actually looked at can be reproduced with a video, as in the case of using CG (Computer Graphics).

As described above, in the present disclosure, the physical property parameters on the subject (including the form, the reflection property, the lighting, and the like) are measured and the property is controlled. This allows the improvement of the quality of a video.

Further, the environment information at the time of viewing (including the lighting, the position of interest, and the like) is taken into consideration at the time of imaging, so that the quality of a video when a human views the video can be controlled to be kept constant.

The physical property parameters on the subject are controlled in consideration of the environment information at the time of imaging or viewing, and errors from the reality that are caused through the imaging and displaying are corrected or emphasized. This allows the improvement of an impression given when a video is viewed.

Further, the information measured at the time of imaging and the information estimated based on the image are integrated, so that reliability can be increased.

Additionally, the information at the time of imaging can be used as metadata, so that an optimum video quality in an environment where a video is viewed can be achieved.

As described above, according to the present disclosure, a more realistic video expression can be achieved. In other words, the property of the subject (including the material, the form, the reflection property, etc.) is controlled, and errors from the reality that are caused through the imaging and displaying are corrected or emphasized. Thus, a situation where the subject is actually looked at can be reproduced with a video, and a strong impression when a video is viewed can be given.

Further, the environment information at the time of viewing is used at the time of imaging, so that the situation where the subject is actually looked at can be reproduced with a video.

10. Ninth Embodiment (Personal Computer)

A series of processing described above may be executed by hardware or software. When the series of processing is executed by software, programs forming the software are installed into a computer. Here, the computer includes a computer integrated in dedicated hardware, a general-purpose personal computer capable of executing various functions by using various programs installed therein, and other computers.

Figure 34:
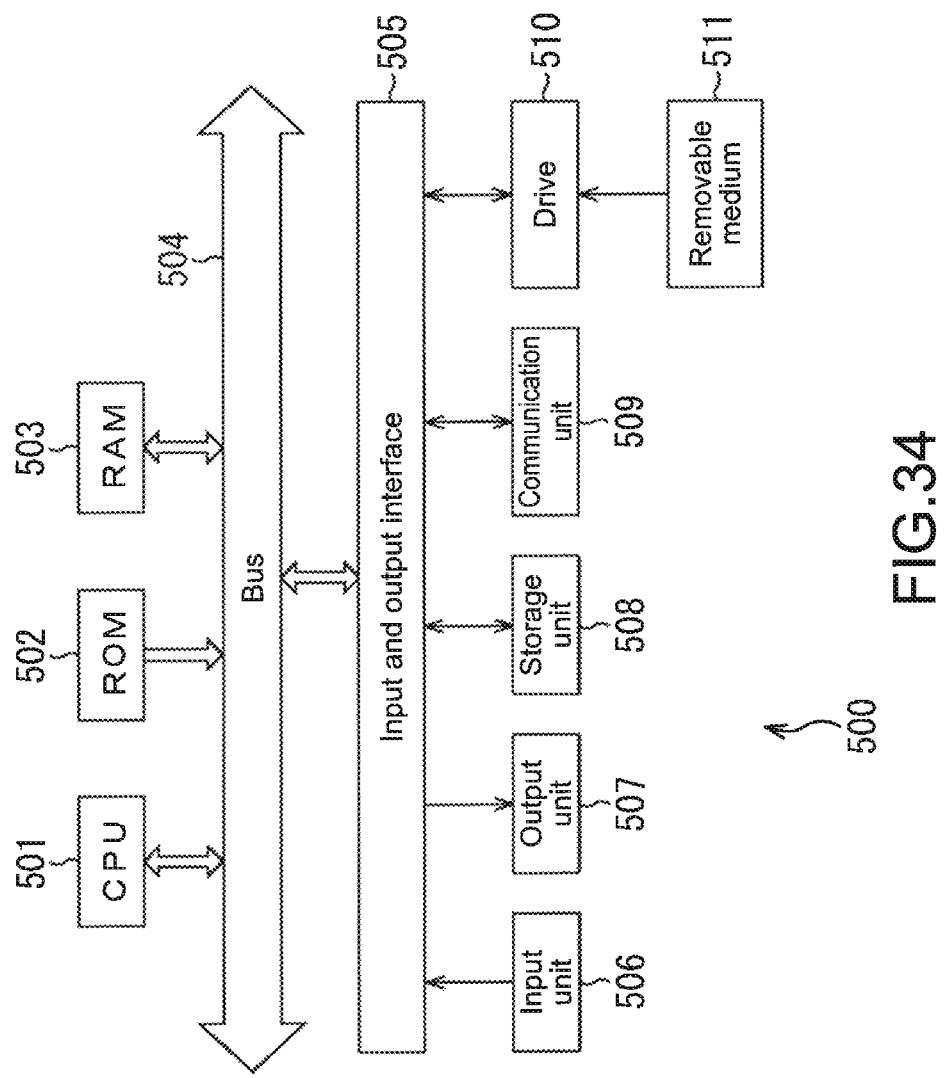
FIG. 34 is a block diagram showing a principal configuration example of a personal computer.

FIG. 34 is a block diagram showing a hardware configuration example of a personal computer 500 that executes the series of processing described above.

In the personal computer 500, a CPU (Central Processing Unit) 501, a ROM (Read Only Memory) 502, and a RAM (Random Access Memory) 503 are connected to one another via a bus 504.

The bus 504 is further connected to an input and output interface 505. The input and output interface 505 is connected to an input unit 506, an output unit 507, a storage unit 508, a communication unit 509, and a drive 510.

The input unit 506 includes a keyboard, a mouse, microphones, and the like. The output unit 507 includes a display, a speaker, and the like. The storage unit 508 includes a hard disk and a non-volatile memory. The communication unit 509 includes a network interface and the like. The drive 510 drives a removable medium 511 such as a magnetic disc, an optical disc, a magneto-optical disc, and a semiconductor memory.

In the personal computer 500 configured as described above, the CPU 501 loads a program stored in, for example, the storage unit 508 to the RAM 503 via the input and output interface 505 and the bus 504 and executes the program. Thus, the series of processing described above is performed.

The program executed by the computer (CPU 501) can be provided by being recorded on the removable medium 511. The removable medium 511 is, for example, a package medium such as a magnetic disc (including a flexible disc), an optical disc (including a CD-ROM (Compact Disc-Read Only Memory) and a DVD (Digital Versatile Disc)), a magneto-optical disc, and a semiconductor memory. Alternatively, the program can be provided via a wired or wireless transmission medium such as a local area network, the Internet, and digital satellite broadcasting.

In the computer, the removable medium 511 is mounted into the drive 510, so that the program can be installed in the storage unit 508 via the input and output interface 505. Further, the communication unit 509 receives the program via a wired or wireless transmission medium, so that the program can be installed in the storage unit 508. In addition, the program can be installed in advance in the ROM 502 or the storage unit 508.

It should be noted that the program executed by the computer may be a program in which processing is executed chronologically along the order described in this specification or may be a program in which processing is executed at necessary timings such as when processing are performed in parallel and when an invocation is performed.

Further, in this specification, the steps describing the program recorded on a recording medium include, in addition to processing that are performed chronologically along the described order, processing that are executed in parallel or individually though not processed chronologically.

Further, in this specification, the system refers to the whole of an apparatus constituted of a plurality of devices (apparatuses).

Furthermore, the configuration described as one apparatus (or processing unit) in the description above may be divided to be configured as a plurality of apparatuses (or processing units). Conversely, the configuration described as a plurality of apparatuses (or processing units) in the description above may be integrated to be configured as one apparatus for processing unit). Moreover, the configuration of each apparatus (or each processing unit) may be additionally provided with configurations other than those described above. Additionally, a part of the configuration of a certain apparatus (or processing unit) may be included in the configuration of another apparatus (or processing unit) if those apparatuses (or processing units) have substantially the same configuration as a whole of the system or perform substantially the same operation. That is, the present disclosure is not limited to the embodiments described above and can be variously modified without departing from the gist of the present disclosure.

Hereinabove, the suitable embodiments of the present disclosure have been described in detail with reference to the attached drawings, but the present disclosure is not limited to such embodiments. It should be understood by those skilled in the art that various modifications, combinations, sub-combinations and alterations may occur depending on design requirements and other factors insofar as they are within the scope of the appended claims or the equivalents thereof.

It should be noted that the present disclosure may take the following configurations.

(1) An image processing apparatus comprising:
a subject property analysis unit configured to obtain information related to a subject within a captured image; and
an image synthesis unit configured to generate an output image, corresponding to the captured image, in which a display texture of the subject has been modified based on the obtained information,
wherein at least one of the subject property analysis unit and the image synthesis unit is implemented via a processor.

(2) The image processing apparatus according to (1), wherein
the obtained information comprises at least one physical property parameter of the subject including information pertaining to at least one of a depth of the subject, a form of the subject, a lighting at a time of capturing the image, a material of the subject, and a reflection property of the subject, and
the display texture of the subject is modified based on the at least one physical property parameter of the subject.

(3) The image processing apparatus according to (2), further comprising:
a visual environment information analysis unit configured to obtain at least one visual environment parameter including information pertaining to at least one of a visual environment lighting, a viewing time, and a subject of interest,
wherein the display texture of the subject is modified based on the at least one physical property parameter of the subject and the at least one visual environment parameter.

(4) The image processing apparatus according to (2), further comprising:
a property control unit configured to determine, based on the at least one physical property parameter, whether or not to obtain at least one visual environment parameter, and to provide control so as the at least one visual environment parameter is only obtained when determining that the at least one visual environment parameter is to be obtained,
wherein the at least one visual environment parameter includes, information pertaining to at least one of a visual environment lighting, a viewing time, and a subject of interest, and
wherein the display texture of the subject is modified based on the at least one physical property parameter of the subject and the at least one visual environment parameter.

(5) The image processing apparatus according to (2), further comprising:
a visual environment information analysis unit configured to obtain at least one visual environment parameter including information pertaining to at least one of a visual environment lighting, a viewing time, and a subject of interest;
a property control unit configured to determine, based on the at least one physical property parameter, whether or not the display texture of the subject is to be modified based also on the at least one visual environment parameter, and when determining that the display texture of the subject is to be modified based also on the at least one visual environment parameter, to control the modification of the display texture of the subject based on the at least one physical property parameter of the subject and the at least one visual environment parameter,
wherein the at least one visual environment parameter includes information pertaining to at least one of a visual environment lighting, a viewing time, and a subject of interest.

(6) The image processing apparatus according to (2), wherein the display texture of the subject is modified by emphasizing a shading of the subject based on the information pertaining to the form of the subject.

(7) The image processing apparatus according to (1), in which
the physical property parameter includes information, on lighting of the subject, and
the texture control unit is configured to adjust a contrast of the subject in the image in accordance with the lighting.

(8) The image processing apparatus according to (2), wherein the display texture of the subject is modified by adjusting a level of reflection of the subject based on the information pertaining to the material of the subject.

(9) The image processing apparatus of according to (2), wherein the display texture of the subject is modified by adjusting a level of reflection of the subject based on the information pertaining to the material of the subject.

(10) The image processing apparatus according to (2), wherein the display texture of the subject is modified by adjusting a level of reflection of the subject based on the information pertaining to the reflection property of the subject.

(11) The image processing apparatus according to (10), wherein
when the information pertaining to the reflection property of the subject indicates a strong specular, reflection component, the display texture of the subject is modified by emphasizing a specular reflection component of the subject in the image by using the information pertaining to the reflection property of the subject,
when the information pertaining to the reflection property of the subject indicates a strong diffuse reflection component, the display texture of the subject is modified by reducing a diffuse reflection component of the subject in the image and emphasizing the specular reflection component of the subject in the image by using the information pertaining to the reflection property of the subject,
when the information pertaining to the material of the subject indicates a strong specular reflection component, the display texture of the subject is modified by emphasizing a specular reflection component of the subject in the image by using the information pertaining to the reflection property of the subject.

(12) The image processing apparatus according to (1), further comprising:
a visual environment information analysis unit configured to obtain at least one visual environment parameter including information pertaining to at least one of a visual environment lighting, a viewing time, and a subject of interest,
wherein the display texture of the subject is modified based on the obtained information and the at least one visual environment parameter.

(13) The image processing apparatus according to (12), wherein a display texture of a background of the generated output image is unmodified from a display texture of a corresponding background within the captured image.

(14) An image processing method comprising:
obtaining information related to a subject within a captured image;
modifying a display texture of the subject based on the obtained information; and
generating an output image corresponding to the captured image, the output image including the subject having the modified display texture.

(15) The image processing method according to (14), wherein
the obtained information comprises at least one physical property parameter of the subject including information pertaining to at least one of a depth of the subject, a form of the subject, a lighting at a time of capturing the image, a material of the subject, and a reflection property of the subject, and
the display texture of the subject is modified based on the at least one physical property parameter of the subject.

(16) The image processing method according to (15), further comprising:
obtaining at least one visual environment parameter including information pertaining to at least one of a visual environment lighting, a viewing time, and a subject of interest,
wherein the obtained information further comprises the at least one visual environment parameter, and the display texture of the subject is modified based on the at least one physical property parameter of the subject and the at least one visual environment parameter.

(17) The image processing method according to (15), further comprising:
determining, based on the at least one physical property parameter, whether or not to obtain at least one visual environment parameter; and
obtaining the at least one visual environment parameter when determined that the at least one visual environment parameter is to be obtained,
wherein the at least one visual environment parameter includes information pertaining to at least one of a visual environment lighting, a viewing time, and a subject of interest, and
wherein the obtained information further comprises the at least one visual environment parameter, and the display texture of the subject is modified based on the at least one physical property parameter of the subject and the at least one visual environment parameter.

(18) The image processing method according to (15), further comprising:

determining, based on the at least one physical property parameter, whether or not to further include at least one visual environment parameter within the obtained information,
wherein the at least one visual environment parameter includes information pertaining to at least one of a visual environment lighting, a viewing time, and a subject of interest, and
wherein when determined that the at least one visual environment parameter is to be included within the obtained information, the display texture of the subject is modified based on the at least one physical property parameter of the subject and the at least one visual environment parameter.

(19) The image processing method according to (14), further comprising:
obtaining at least one visual environment parameter including information pertaining to at least one of a visual environment lighting, a viewing time, and a subject of interest,
wherein the obtained information comprises the at least one visual environment parameter, and the display texture of the subject is modified based on the at least one physical property parameter of the subject and the at least one visual environment parameter.

(20) The image processing method according to (19), wherein the at least one visual environment parameter is obtained at a time of capturing the image.

(21) The image processing method according to (19), wherein the at least one visual environment parameter corresponds to an environment within which the generated output image is to be reproduced for viewing.

(22) The image processing method according to (14), wherein a display texture of a background of the generated output image is unmodified from a display texture of a corresponding background within the captured image.

(23) A non-transitory computer-readable medium having embodied there a program, which when executed by a computer causes the computer to perform a method, the method comprising:
obtaining information related to a subject within a captured image;
modifying a display texture of the subject based on the obtained information; and
generating an output image corresponding to the captured image, the output image including the subject having the modified display texture.

What is claimed is:
1. An image processing apparatus comprising:
a subject property analysis unit configured to obtain information related to a subject within a captured image; and
an image synthesis unit configured to generate an output image, corresponding to the captured image, in which a display texture of the subject has been modified based on the obtained information,
wherein the obtained information comprises at least one physical property parameter of the subject including information pertaining to at least one of a depth of the subject, a form of the subject, a lighting at a time of capturing the image, a material of the subject, and a reflection property of the subject,
wherein, when the at least one physical property parameter of the subject indicates an uneven and dense form, the display texture of the subject is modified by applying self shadow emphasis, wherein, when the at least one physical property parameter of the subject indicates a sparse form, the display texture of the subject is modified by applying cast shadow emphasis, and wherein the subject property analysis unit and the image synthesis unit are each implemented via at least one processor.

2. The image processing apparatus of claim 1, further comprising:

a visual environment information analysis unit configured to obtain at least one visual environment parameter including information pertaining to at least one of a visual environment lighting, a viewing time, and a subject of interest, wherein the display texture of the subject is modified based on the at least one physical property parameter of the subject and the at least one visual environment parameter, and wherein the visual environment information analysis unit is implemented via at least one processor.

3. The image processing apparatus of claim 1, further comprising:

a property control unit configured to determine, based on the at least one physical property parameter, whether or not to obtain at least one visual environment parameter, and to provide control so as the at least one visual environment parameter is only obtained when determining that the at least one visual environment parameter is to be obtained, wherein the at least one visual environment parameter includes information pertaining to at least one of a visual environment lighting, a viewing time, and a subject of interest, wherein the display texture of the subject is modified based on the at least one physical property parameter of the subject and the at least one visual environment parameter, and wherein the property control unit is implemented via at least one processor.

4. The image processing apparatus of claim 1, further comprising:

a visual environment information analysis unit configured to obtain at least one visual environment parameter including information pertaining to at least one of a visual environment lighting, a viewing time, and a subject of interest;

a property control unit configured to determine, based on the at least one physical property parameter, whether or not the display texture of the subject is to be modified based also on the at least one visual environment parameter, and when determining that the display texture of the subject is to be modified based also on the at least one visual environment parameter, to control the modification of the display texture of the subject based on the at least one physical property parameter of the subject and the at least one visual environment parameter, wherein the at least one visual environment parameter includes information pertaining to at least one of a visual environment lighting, a viewing time, and a subject of interest, and wherein the visual environment information analysis unit and the property control unit are each implemented via at least one processor.

5. The image processing apparatus of claim 1, wherein the display texture of the subject is modified by adjusting a contrast of the subject based on the information pertaining to the lighting at the time of capturing the image.

6. The image processing apparatus of claim 1, wherein the display texture of the subject is modified by adjusting a level of reflection of the subject based on the information pertaining to the material of the subject.

7. The image processing apparatus of claim 1, wherein the display texture of the subject is modified by adjusting a level of reflection of the subject based on the information pertaining to the reflection property of the subject.

8. The image processing apparatus of claim 7, wherein when the information pertaining to the reflection property of the subject indicates a strong specular reflection component, the display texture of the subject is modified by emphasizing a specular reflection component of the subject in the image by using the information pertaining to the reflection property of the subject, when the information pertaining to the reflection property of the subject indicates a strong diffuse reflection component, the display texture of the subject is modified by reducing a diffuse reflection component of the subject in the image and emphasizing the specular reflection component of the subject in the image by using the information pertaining to the reflection property of the subject, when the information pertaining to the material of the subject indicates a strong specular reflection component, the display texture of the subject is modified by emphasizing a specular reflection component of the subject in the image by using the information pertaining to the reflection property of the subject.

9. The image processing apparatus of claim 1, further comprising:

a visual environment information analysis unit configured to obtain at least one visual environment parameter including information pertaining to at least one of a visual environment lighting, a viewing time, and a subject of interest, wherein the display texture of the subject is modified based on the obtained information and the at least one visual environment parameter, and wherein the visual environment information analysis unit is implemented via at least one processor.

10. The image processing apparatus of claim 9, wherein a display texture of a background of the generated output image is unmodified from a display texture of a corresponding background within the captured image.

11. The image processing apparatus of claim 1, wherein the display texture of the subject is modified to restore a display texture according to a type of material indicated by the information pertaining to the material of the subject.

12. An image processing method, implemented via at least one processor, the method comprising:

obtaining information related to a subject within a captured image;

modifying a display texture of the subject based on the obtained information; and generating an output image corresponding to the captured image, the output image including the subject having the modified display texture, wherein the obtained information comprises at least one physical property parameter of the subject including information pertaining to at least one of a depth of the subject, a form of the subject, a lighting at a time of capturing the image, a material of the subject, and a reflection property of the subject, wherein, when the at least one physical property parameter of the subject indicates an uneven and dense form, the display texture of the subject is modified by applying self shadow emphasis, and wherein, when the at least one physical property parameter of the subject indicates a sparse form, the display texture of the subject is modified by applying cast shadow emphasis.

13. The image processing method of claim 12, further comprising:

obtaining at least one visual environment parameter including information pertaining to at least one of a visual environment lighting, a viewing time, and a subject of interest, wherein the obtained information further comprises the at least one visual environment parameter, and the display texture of the subject is modified based on the at least one physical property parameter of the subject and the at least one visual environment parameter.

14. The image processing method of claim 12, further comprising:

determining, based on the at least one physical property parameter, whether or not to obtain at least one visual environment parameter; and obtaining the at least one visual environment parameter when determined that the at least one visual environment parameter is to be obtained, wherein the at least one visual environment parameter includes information pertaining to at least one of a visual environment lighting, a viewing time, and a subject of interest, and wherein the obtained information further comprises the at least one visual environment parameter, and the display texture of the subject is modified based on the at least one physical property parameter of the subject and the at least one visual environment parameter.

15. The image processing method of claim 12, further comprising:

determining, based on the at least one physical property parameter, whether or not to further include at least one visual environment parameter within the obtained information, wherein the at least one visual environment parameter includes information pertaining to at least one of a visual environment lighting, a viewing time, and a subject of interest, and wherein when determined that the at least one visual environment parameter is to be included within the obtained information, the display texture of the subject is modified based on the at least one physical property parameter of the subject and the at least one visual environment parameter.

16. The image processing method of claim 12, further comprising:

obtaining at least one visual environment parameter including information pertaining to at least one of a visual environment lighting, a viewing time, and a subject of interest, wherein the obtained information comprises the at least one visual environment parameter, and the display texture of the subject is modified based on the at least one physical property parameter of the subject and the at least one visual environment parameter.

17. The image processing method of claim 16, wherein the at least one visual environment parameter is obtained at a time of capturing the image.

18. The image processing method of claim 16, wherein the at least one visual environment parameter corresponds to an environment within which the generated output image is to be reproduced for viewing.

19. The image processing method of claim 12, wherein a display texture of a background of the generated output image is unmodified from a display texture of a corresponding background within the captured image.

20. A non-transitory computer-readable medium having embodied there a program, which when executed by a computer causes the computer to perform a method, the method comprising:

obtaining information related to a subject within a captured image;

modifying a display texture of the subject based on the obtained information; and generating an output image corresponding to the captured image, the output image including the subject having the modified display texture, wherein the obtained information comprises at least one physical property parameter of the subject including information pertaining to at least one of a depth of the subject, a form of the subject, a lighting at a time of capturing the image, a material of the subject, and a reflection property of the subject, wherein, when the at least one physical property parameter of the subject indicates an uneven and dense form, the display texture of the subject is modified by applying self shadow emphasis, and wherein, when the at least one physical property parameter of the subject indicates a sparse form, the display texture of the subject is modified by applying cast shadow emphasis.

* * * * *